United States Patent
Kang et al.

(10) Patent No.: US 11,057,762 B2
(45) Date of Patent: Jul. 6, 2021

(54) ELECTRONIC DEVICE AND METHOD FOR SWITCHING ELECTRONIC DEVICE BETWEEN DUAL STANDBY MODE AND SINGLE STANDBY MODE

(71) Applicant: Samsung Electronics Co., Ltd., Suwon-si (KR)

(72) Inventors: Junwon Kang, Suwon-si (KR); Hyongjin Ban, Suwon-si (KR); Jeongtak Bae, Suwon-si (KR); Sanghwi Lee, Suwon-si (KR); Jieun Jung, Suwon-si (KR); Sukwhan Kim, Suwon-si (KR); Daesoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/892,851

(22) Filed: Jun. 4, 2020

(65) Prior Publication Data

US 2020/0389783 A1 Dec. 10, 2020

(30) Foreign Application Priority Data

Jun. 7, 2019 (KR) .................. 10-2019-0067326

(51) Int. Cl.
*H04W 8/18* (2009.01)
(52) U.S. Cl.
CPC .................. *H04W 8/183* (2013.01)
(58) Field of Classification Search
CPC .................. H04B 1/3816; H04L 63/0853
See application file for complete search history.

(56) References Cited

U.S. PATENT DOCUMENTS 8,909,290 B2 12/2014 Ruvalcaba et al.
9,154,601 B2 10/2015 He et al.
(Continued)

FOREIGN PATENT DOCUMENTS

KR 10-2016-0010239 A 1/2016
WO 2018/048278 A1 3/2018

OTHER PUBLICATIONS

GSMA_RSP_Architecture_SGP.21_Ver_2.1_Feb. 27, 2017 (Year: 2017).*

(Continued)

*Primary Examiner* — Ernest G Tacsik
(74) *Attorney, Agent, or Firm* — Jefferson IP Law, LLP

(57) ABSTRACT

An electronic device and an electronic-device-operating method are provided. The electronic device includes an embedded subscriber identity module (eSIM) embedded in the electronic device, the eSIM storing a first profile associated with a first communication service, a physical subscriber identity module (pSIM) configured such that a SIM card is capable of being removably attached thereto or capable of being inserted thereinto, the pSIM storing a second profile associated with a second communication service, a communication processor configured to control the eSIM and the pSIM, and a processor. The processor is configured to receive a signal indicating switching from a dual standby mode to a single standby mode, control a local profile assistant in device (LPAd) configured to control the eSIM in response to reception of the signal, delete a task associated with the eSIM in response to completion of disabling the LPAd, request deactivating of a protocol stack corresponding to the eSIM in response to deleting the task, and reset the communication processor in response to deactivation of the protocol stack.

20 Claims, 15 Drawing Sheets

(56) References Cited

U.S. PATENT DOCUMENTS

| | | |
|---|---|---|
| 9,705,546 B2 | 7/2017 | Lee et al. |
| 2011/0117962 A1 | 5/2011 | Qiu et al. |
| 2014/0038601 A1 | 2/2014 | Gouriou et al. |
| 2016/0088464 A1 | 3/2016 | Hans |
| 2017/0214423 A1 | 7/2017 | Park et al. |
| 2017/0280321 A1* | 9/2017 | Caceres ................. H04W 4/50 |
| 2017/0359762 A1 | 12/2017 | Yoo et al. |
| 2017/0366962 A1* | 12/2017 | Kim ..................... H04W 48/16 |
| 2018/0249322 A1 | 8/2018 | Kim et al. |
| 2019/0069171 A1* | 2/2019 | Baldischweiler ....... G06F 21/78 |
| 2019/0208405 A1 | 7/2019 | Park et al. |
| 2020/0228969 A1* | 7/2020 | Shin ..................... H04W 12/06 |
| 2020/0351656 A1* | 11/2020 | Johansson ............... H04W 4/50 |

OTHER PUBLICATIONS

International Search Report dated Sep. 7, 2020, issued in International Application No. PCT/KR2020/007271.
Extended European Search Report dated Sep. 10, 2020, issued in European Application No. 20178320.6-1212.

* cited by examiner

ELECTRONIC DEVICE AND METHOD FOR SWITCHING ELECTRONIC DEVICE BETWEEN DUAL STANDBY MODE AND SINGLE STANDBY MODE

CROSS-REFERENCE TO RELATED APPLICATION(S)

This application is based on and claims priority under 35 U.S.C. § 119(a) of a Korean patent application number 10-2019-0067326, filed on Jun. 7, 2019, in the Korean Intellectual Property Office, the disclosure of which is incorporated by reference herein in its entirety.

BACKGROUND

1. Field

The disclosure relates to an electronic device and a method of operating the electronic device. More particularly, the disclosure relates to switching the electronic device between a dual standby mode and a single standby mode.

2. Description of Related Art

Various electronic devices, such as smart phones, tablet PCs, portable multimedia players (PMPs), personal digital assistants (PDAs), laptop personal computers (PCs), and wearable devices, have been distributed.

Various electronic devices may use a network provided by a communications company in order to perform wireless communication. Recent electronic devices may include at least two subscriber identity modules in order to be able to use two or more communication services.

An electronic device having at least two subscriber identity modules may support a dual standby mode in which two communication services are available and a single standby mode in which only one of the two communication services is available.

The above information is presented as background information only to assist with an understanding of the disclosure. No determination has been made, and no assertion is made, as to whether any of the above might be applicable as prior art with regard to the disclosure.

SUMMARY

An electronic device capable of supporting a dual standby mode is provided. The electronic device includes a physical subscriber identity module (SIM) to which a SIM card is removably attached and an embedded SIM (eSIM). The electronic device may be unable to perform switching between a dual standby mode and a single standby mode during operation. In this case, even if the electronic device capable of supporting the dual standby mode uses only one modem corresponding to the physical SIM (pSIM) in the dual standby mode, switching to the single standby mode may not be possible.

When switched to the single standby mode, a protocol stack associated with the eSIM remains active even though the communication service corresponding to the eSIM is not being used, whereby a phenomenon in which power consumption caused by the activation of the protocol stack unnecessarily increases may occur.

Aspects of the disclosure are to address at least the above-mentioned problems and/or disadvantages and to provide at least the advantages described below. Accordingly, an aspect of the disclosure is to provide an electronic device and a method of operating the electronic device capable of switching the electronic device between a dual standby mode and a single standby mode.

Additional aspects will be set forth in part in the description which follows and, in part, will be apparent from the description, or may be learned by practice of the presented embodiments.

In accordance with another aspect of the disclosure, an electronic device is provided The electronic device includes an embedded subscriber identity module embedded in the electronic device, the embedded subscriber identity module being configured to store a first profile associated with the first communication service, a physical subscriber identity module configured such that a SIM card is capable of being removably attached thereto or capable of being inserted thereinto, the physical subscriber identity module being configured to store a second profile associated with a second communication service, a communication processor configured to control the embedded subscriber identity module and the physical subscriber identity module, and a processor. The processor may be configured to receive a signal indicating switching from a dual standby mode, in which the first communication service and the second communication service are available to a single standby mode, in which the second communication service is available, control a local profile assistant in device (LPAd) configured to control the embedded subscriber identity module in response to reception of the signal, delete a task associated with the embedded subscriber identity module in response to completion of disabling of the LPAd, request an operation of deactivating a protocol stack corresponding to the embedded subscriber identity module in response to deletion of the task, and reset the communication processor in response to deactivation of the protocol stack.

In accordance with another aspect of the disclosure, an electronic device operating method is provided. The electronic device operating method includes an operation of receiving a signal indicating switching from a dual standby mode, in which the first communication service and the second communication service are available, to a single standby mode, in which the second communication service is available, an operation of disabling a local profile assistant in device (LPAd) configured to control an embedded subscriber identity module configured to store a first profile associated with the first communication service in response to reception of the signal, an operation of deleting a task associated with the embedded subscriber identity module in response to completion of the disabling of the LPAd, an operation of deactivating a protocol stack corresponding to the embedded subscriber identity module in response to the deleting of the task, and an operation of resetting a communication processor configured to control the embedded subscriber identity module in response to the deactivating of the protocol stack.

With an electronic device according to various embodiments and a method of operating the electronic device, it is possible to perform switching between the dual standby mode and the single standby mode while the electronic device is operating.

With an electronic device according to various embodiments and a method of operating the electronic device, it is possible to provide a user interface for switching between the dual standby mode and the single standby mode while the electronic device is operating.

With an electronic device according to various embodiments and a method of operating the electronic device, it is possible to reduce power consumption by a terminal unnecessarily operating in the dual standby mode.

With an electronic device according to various embodiments and a method of operating the electronic device, since it is possible to deactivate an eSIM unnecessary in the single standby mode and a protocol associated therewith, it is possible to improve the processing speed of the electronic device and to reduce the power consumption by the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
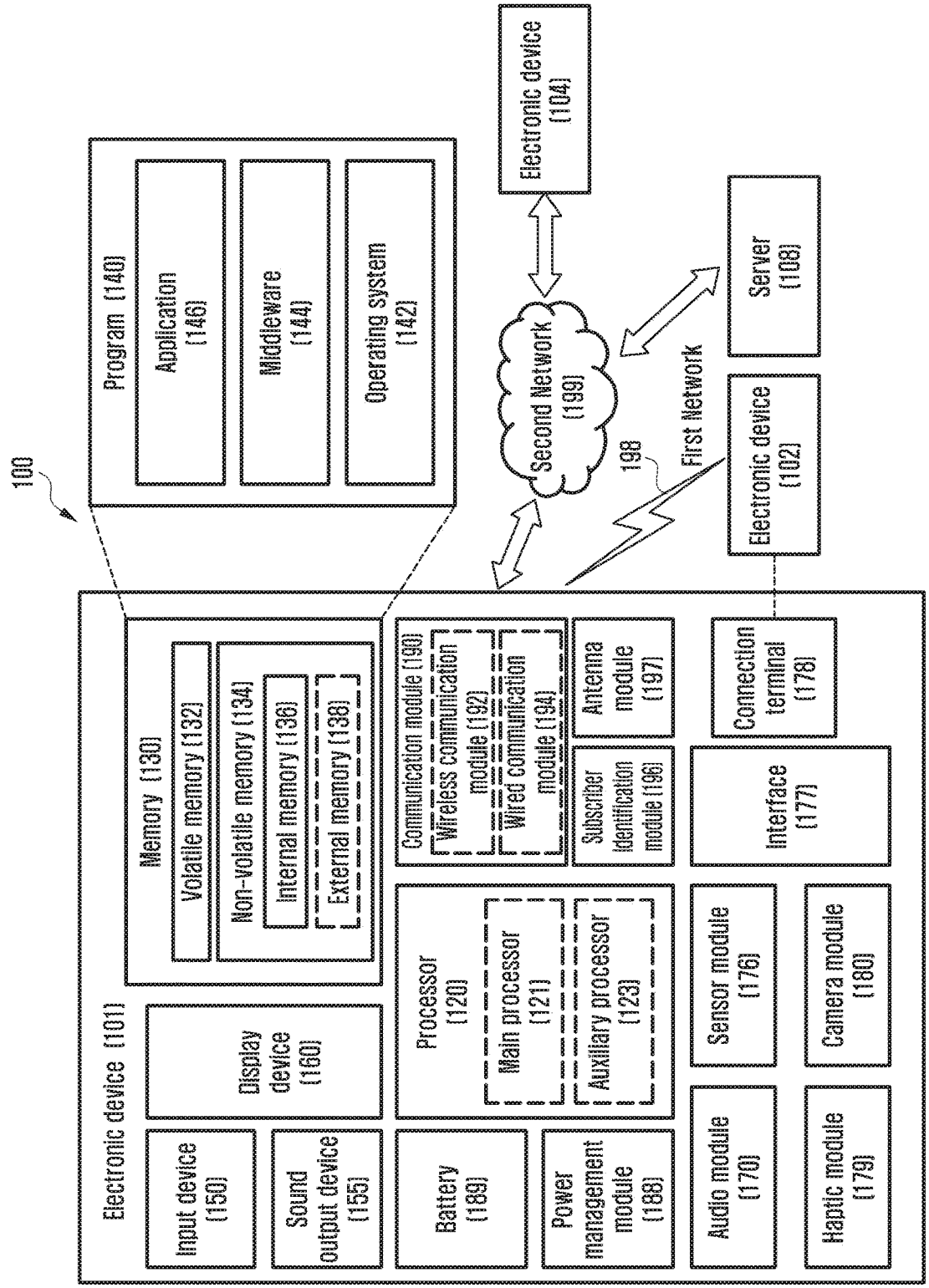
FIG. 1 is a block diagram of an electronic device according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
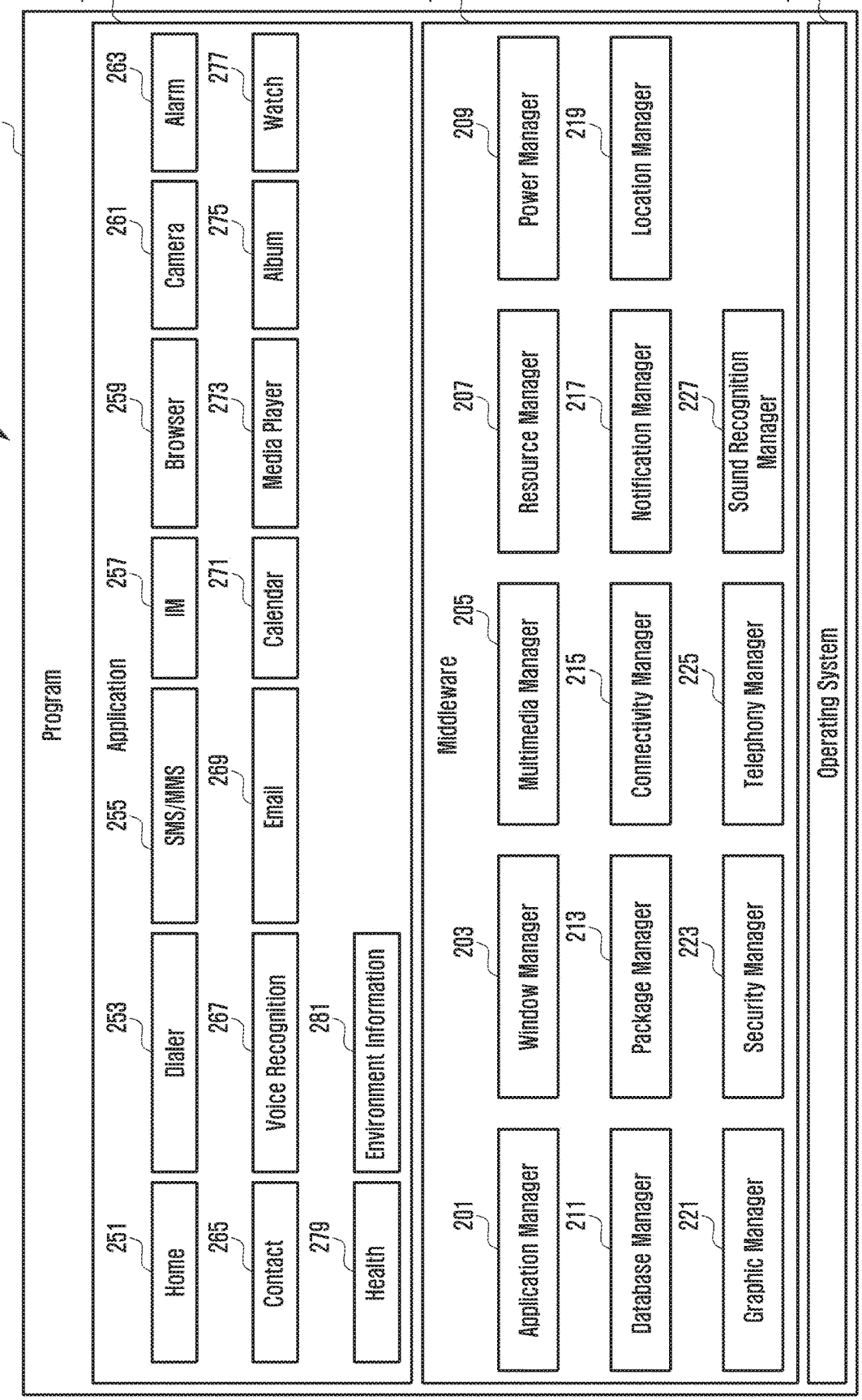
FIG. 2 is a block diagram of a program according to an embodiment of the disclosure.

FIG. 2 is a block diagram 200 illustrating the program 140 according to an embodiment of the disclosure.

Referring to FIG. 2, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

According to various embodiments, a subscriber identity module (SIM) may mean a smart card, which is used in the state of being inserted into a mobile communication terminal and stores personal information such as network access authentication information, a phone book, and SMS of a mobile communication subscriber so as to enable safe use of mobile communication by performing subscriber authentication and traffic security key generation when accessing a mobile communication network such as Global System for Mobile Communications (GSM), Wideband Code Division Multiple Access (WCDMA), or long-term evolution (LTE). The subscriber identity module may be provided with a communication application of a subscriber identity module (SIM), a universal SIM (USIM), or an IP multimedia SIM (ISIM) depending on the type of mobile communication network to which the subscriber is connected. In addition, the subscriber identity module may provide high-level security functions for mounting various applications such as electronic wallet, ticketing, and an electronic passport.

According to various embodiments, an embedded subscriber identity module (embedded SIM (eSIM)) may be a security module in the form of a chip embedded in a terminal, rather than a physical SIM, which is capable of being inserted into and removed from a terminal. The eSIM is capable of downloading and installing a profile using over-the-air (OTA) technology. The eSIM may be defined as a subscriber identity module capable of downloading and installing a profile.

According to various embodiments, the term "SIM" may mean a universal integrated circuit card (UICC), and the term "eSIM" may mean an embedded UICC (eUICC).

According to various embodiments, a profile may mean an application, a file system, or an authentication key value, which is to be stored in a SIM or eSIM, packaged in a software form.

According to various embodiments, an electronic device may include therein a SIM capable downloading and installing a profile. A SIM physically separated from an electronic device may be inserted into and connected to the electronic device. For example, the SIM may be inserted into the electronic device in the form of a card. The SIM may be embedded in or inserted into a terminal. A SIM capable of downloading and installing a profile may mean an eSIM.

Hereinafter, an electronic device according to various embodiments will be described.

Figure 3:
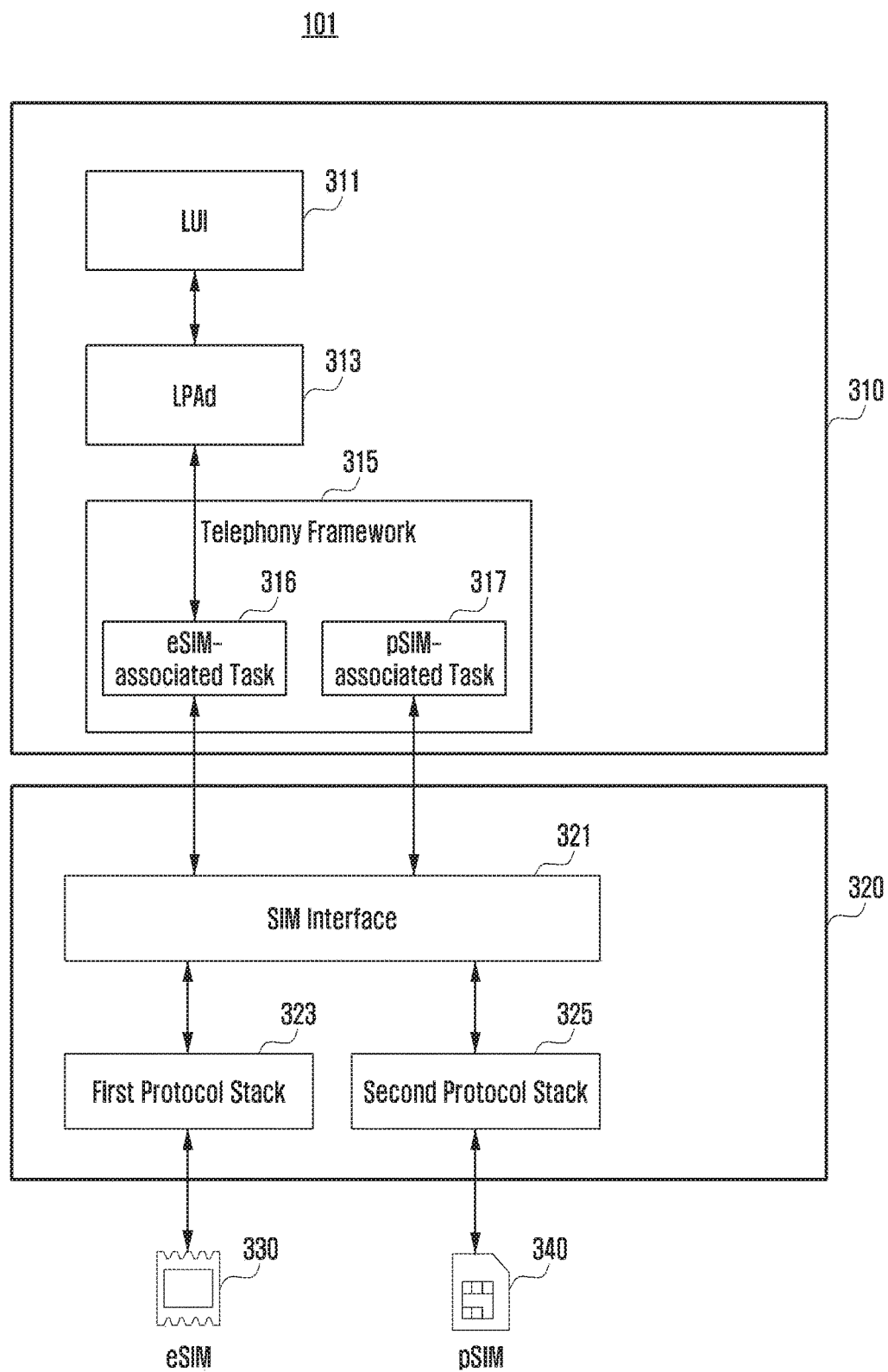
FIG. 3 is a block diagram of an electronic device according to an embodiment of the disclosure.

FIG. 3 is a block diagram of an electronic device according to an embodiment of the disclosure.

Referring to FIG. 3, an electronic device (e.g., the electronic device 101 in FIG. 1) according to various embodiments may include a processor 310 (e.g., the processor 120 in FIG. 1), a communication processor 320 (e.g., the communication module 190 in FIG. 1), an eSIM 330 (e.g., the SIM 196 in FIG. 1), and a physical subscriber identity module (pSIM) 340 (e.g., the subscriber identity module 196 of FIG. 1).

According to various embodiments, the eSIM 330 may be embedded in the electronic device 101, and may store a first profile associated with a first communication service.

According to various embodiments, the pSIM 340 is a SIM configured such that a SIM card is capable of being inserted thereinto or capable of being removably attached thereto, and may store a second profile associated with a second communication service.

According to various embodiments, the communication processor 320 may control the pSIM 340 and the eSIM 330. The communication processor 320 may perform authentication with a server operated by a service provider providing a second communication service using the second profile stored in the pSIM 340. The communication processor 320 may transmit or receive data using the second communication service based on the authentication result for the second communication service. The communication processor 320 may perform authentication with a server operated by a service provider providing a second communication service using the first profile stored in the eSIM 330. The communication processor 320 may transmit or receive data using the first communication service based on the authentication result for the first communication service.

According to various embodiments, the communication processor 320 may include an interface (e.g., a SIM interface) 321 for transmitting or receiving data with the pSIM 340 or the eSIM 330. The communication processor 320 may support data communication between the processor 310 and the pSIM 340 or between the processor 310 and the eSIM 330 through the interface 321.

According to various embodiments, the first protocol stack 323 and the second protocol stack 325 may be implemented on the communication processor 320. The first protocol stack 323 and the second protocol stack 325 may mean a set of protocols associated with the operation of the eSIM 330 or the pSIM 340. For convenience of description, the first protocol stack 323 is defined as a set of protocols associated with the operations used by the eSIM 330, and the second protocol stack 325 is defined as a set of protocols associated with the operations used by the pSIM 340. For example, the first protocol stack 323 may include a task for checking whether or not the eSIM 330 exists or a task for transmitting a polling signal to the eSIM 330 in each predetermined period. For example, the second protocol stack 325 may include a task for checking whether or not the pSIM 340 exists or a task for transmitting a polling signal to the pSIM 340 in each predetermined period. The communication processor 320 may support a plurality of protocol stacks including the first protocol stack 323 and the second protocol stack 325. One protocol stack may support at least one wireless communication technology among various communication schemes (GSM, Universal Mobile Telecommunications Service (UMTS), LTE, code-division multiple access (CDMA), or 5G).

According to various embodiments, the interface 321, the first protocol stack 323 or the second protocol stack 325 may be implemented in software on the communication processor 320.

According to various embodiments, the electronic device 101 may support a dual standby mode in which both the first communication service and the second communication service are activated. The dual standby mode may mean a mode in which the first communication service and the second communication service can be used simultaneously or separately. The electronic device 101 may support a single standby mode in which any one of the first communication service and the second communication service is activated. The single standby mode may mean a mode in which the first communication service is activated and the second communication service is deactivated, or a mode in which the second communication service is activated and the first communication service is deactivated. For convenience of description, the single standby mode is described assuming that the second communication service corresponding to the pSIM 340 is activated and the first communication service corresponding to the eSIM 330 is deactivated.

According to various embodiments, the dual standby mode may be the state in which both the first communication service and the second communication service are activated, whereby a modem supporting the first communication service and a modem supporting the second communication service are both activated.

According to various embodiments, the single standby mode may be the state in which the second communication service is activated, whereby a modem supporting the second communication service is activated. In the single standby mode, the first communication service is in the deactivated state, and an operation associated with the first communication service may not be required. According to a comparative example, operations associated with the first communication service (e.g., a standby operation in the state in which the modem supporting the first communication service is activated and an operation of performing a task for the first profile when the task for the first profile corresponding to the first communication service exists on the processor 310) may be performed, thereby causing power consumption. Hereinafter, a description will be made of a content of reducing power consumption by not performing an operation associated with the first communication service.

According to various embodiments, a local user interface (LUI) 311, a local profile assistant in the device (LPAd) 313, and a framework 315 (e.g., a telephony framework) may be implemented in software on the processor 310.

According to various embodiments, the LUI 311 may provide a user interface associated with setting of the first communication service capable of being supported by the eSIM 330 or management of a first profile.

According to various embodiments, the LPAd 313 may be an application that manages at least one profile capable of being stored in the eSIM 330. The LPAd 313 may manage the first profile (e.g., perform various management tasks including modifying the first profile, deleting the first profile, and updating the first profile).

According to various embodiments, the framework 315 (e.g., the middleware 144 in FIG. 1) may provide various functions to an application so that functions provided from one or more resources of the electronic device 101 can be used by the application. The framework 315 according to various embodiments may include a telephony framework capable of supporting the function of the first communication service or the second communication service.

According to various embodiments, the framework 315 may include an eSIM-associated task 316 for supporting the function of the first communication service corresponding to the eSIM 330 and a pSIM-associated task 317 running on the framework 315 for supporting the function of the second communication service corresponding to the pSIM 340.

According to various embodiments, the processor 310 may receive a signal indicating switching from the dual standby mode to the single standby mode.

According to various embodiments, a signal indicating switching from the dual standby mode to the single standby mode may be generated by user input on a user interface provided by the LUI 311. The processor 310 may receive user input by which the user switches to the single standby mode on the user interface provided by the LUI 311.

According to various embodiments, a signal indicating switching from the dual standby mode to the single standby mode may be provided by an external server operated by a service provider that provides the first communication service or the second communication service or an external server operated by a manufacturer of the electronic device 101. The external server may transmit a signal indicating switching to the single standby mode in the state in which one of the first communication service or the second communication service cannot be provided.

According to various embodiments, the processor 310 may perform an operation of disabling the first profile corresponding to the first communication service in response to reception of a signal indicating switching to the single standby mode. The operation of disabling the first profile may mean an operation of deactivating the first communication service using the first profile.

According to various embodiments, the processor 310 may control the LPAd 313, which controls the eSIM 330, to be disabled in response to reception of the signal indicating switching to the single standby mode.

According to various embodiments, the LPAd 313 may disable the management function of the first profile. Through this, the LPAd 313 may be disabled in the single standby mode. The LPAd 313 may disable a function other than an event receiver function that receives a signal indicating switching from the single standby mode to the dual standby mode.

According to various embodiments, the processor 310 may control the LPAd 313 to be disabled in response to reception of the signal indicating switching to the single standby mode. Since the LPAd 313 is disabled, the electronic device 101 may not provide a user interface associated with management of the first profile in the single standby mode.

According to various embodiments, the processor 310 may delete an eSIM-associated task 316 associated with the eSIM from the processor 310 in response to completion of the operation of disabling the LPAd 313. Deleting the eSIM-associated task 316 associated with the eSIM may mean that the eSIM-associated task 316 associated with the eSIM is not performed or that the task associated with the eSIM running on the processor 310 is terminated.

According to various embodiments, the eSIM-associated task 316 associated with the eSIM may mean a task related to a communication service (the first communication service) corresponding to a profile stored in the eSIM 330. For example, the eSIM-associated task 316 may include tasks associated with various operations associated with a communication service (e.g., a call service, a message transmission or reception service, or a data transmission or reception service), which may be provided through a profile stored in the eSIM 330.

According to various embodiments, by deleting the eSIM-associated task 316, the eSIM-associated task 316 may not be performed on the framework 315. Through this, the electronic device 101 may reduce power consumption by not performing the eSIM-associated task 316 in the single standby state.

According to various embodiments, the LPAd 313 may be controlled not to upload the eSIM-associated task 316 to RAM when the electronic device 101 is rebooted in the single standby mode. Through this, the electronic device 101 may reduce power consumption by not performing the eSIM-associated task 316 in the single standby state.

According to various embodiments, the processor 310 may deactivate the first protocol stack 323 in response to deleting the eSIM-associated task 316.

According to various embodiments, by deactivating the first protocol stack 323, the first communication service, which is a communication service using the eSIM 330, may be deactivated. Deactivating the first communication service may mean that all services (e.g., the first communication service using the first profile) are not provided. Through this, the electronic device 101 may reduce power consumption caused by activation of the first protocol stack 323 corresponding to the eSIM 330 in the single standby state.

According to various embodiments, the deactivation of the first protocol stack 323 may include a mode in which identification information (e.g., international mobile equipment identity (IMEI)) stored in the deactivated memory of the communication processor 320 is disabled such that the identification information cannot be referred to on the electronic device 101.

According to various embodiments, the electronic device 101 may support an operation of switching from the single standby state to the dual standby state. This embodiment will be described later with reference to FIG. 6.

Figure 4:
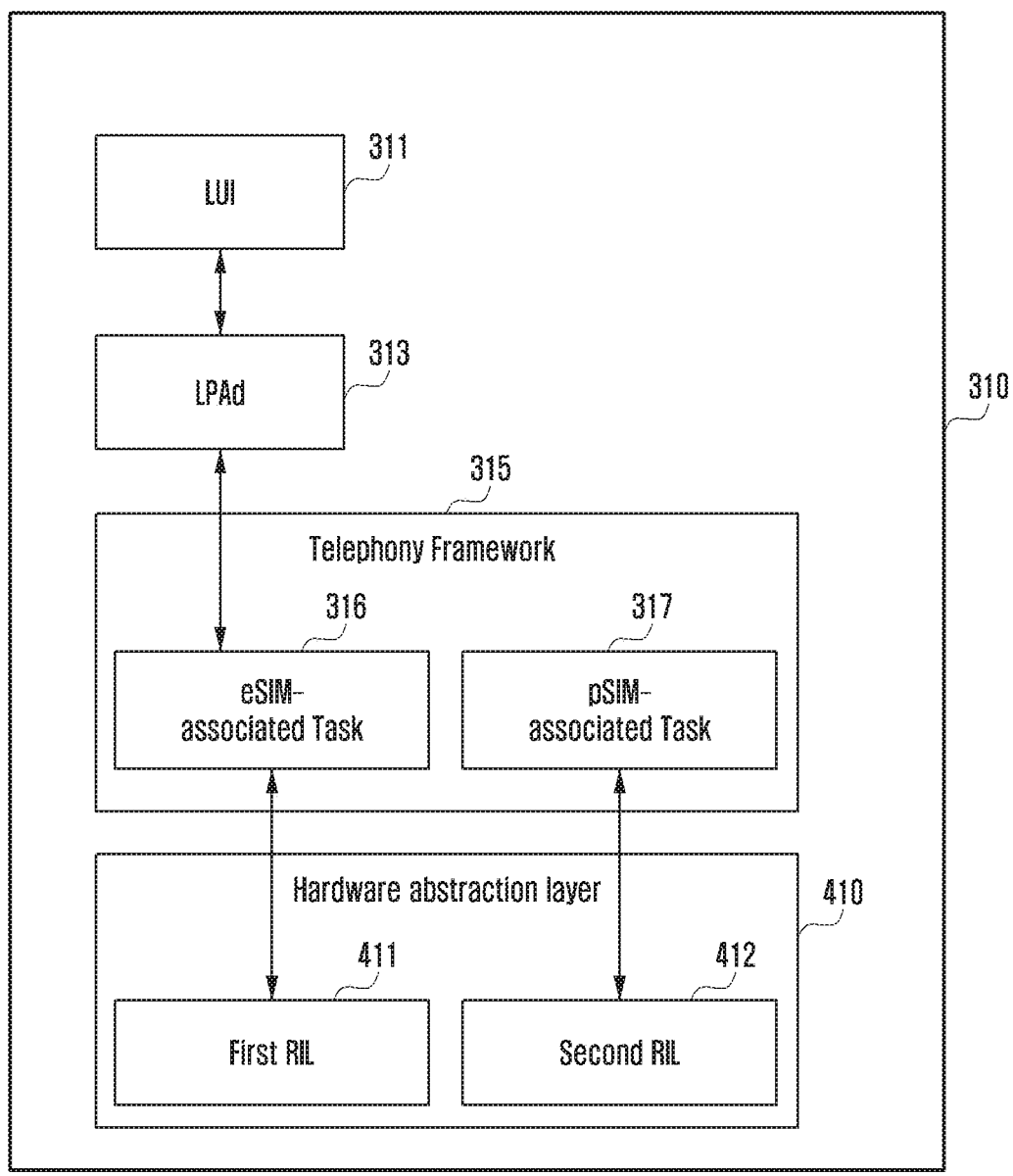
FIG. 4 is a block diagram illustrating a configuration, which is disabled while being switched from a dual standby mode to a single standby mode, in an electronic device according to an embodiment of the disclosure.

FIG. 4 is a block diagram illustrating a configuration associated with switching from a dual standby mode to a single standby mode in an electronic device according to an embodiment of the disclosure.

Referring to FIG. 4, an electronic device (e.g., the electronic device 101 in FIG. 1) according to various embodiments may include a processor 310 switched to a single standby state. The processor 310 may include a local user interface (LUI) 311, a local profile assistant in the device (LPAd) 313, a framework 315, and a hardware abstraction layer (HAL) 410.

According to various embodiments, the LUI 311, the LPAd, the framework 315, or a hardware abstraction layer 410 may be implemented in software on the communication processor 310.

According to various embodiments, the hardware abstraction layer 410 may refer to an abstracted layer between a plurality of hardware modules (e.g., an eSIM (e.g., the eSIM 330 in FIG. 3) and a pSIM (e.g., the pSIM 340 in FIG. 3)) included in a hardware layer (not illustrated) and software (e.g., the framework 314) of the electronic device 101, and may mean a collection of routines for processing details depending on hardware required for input/output interface and interrupt control. The hardware abstraction layer 410 may include a first radio interface layer (RIL) 411 for transmitting or receiving data to or from the first protocol stack 323 and a second radio interface layer 412 for transmitting or receiving data to or from the second protocol stack 325. The first RIL 411 and the second RIL 412 may be interfaces for transmitting or receiving data to or from the first protocol stack 323 and the second protocol stack 325. For convenience, the first RIL 411 is defined as an interface layer for transmitting or receiving data to or from the first protocol stack 323, which is a protocol stack corresponding to the eSIM 330, and the second RIL 412 is defined as an interface layer for transmitting or receiving data to or from the second protocol stack 325, which is a protocol stack corresponding to the pSIM 340.

According to various embodiments, the first communication service may be deactivated when the dual standby mode is switched to the single standby mode. In response to the switching from the dual standby mode to the single standby mode, the processor 310 may disable various components for supporting the first communication service. The processor 310 may disable the LUI 311, the LPAd 313, and the eSIM-associated task 316, which are components for supporting the first communication service. The processor 310 may also disable the first RIL 411. The eSIM-associated task 316 may be disabled in a manner of being removed from memory (e.g., volatile memory 132 in FIG. 1) for storing data in a non-transitory manner. The first RIL 411 may also be disabled in a manner of being removed from the memory 130. The eSIM-associated task 316 and the first RIL 411 may not be uploaded into the memory 130 even when the electronic device 101 is rebooted.

Through the methods described above, the electronic device 101 may reduce power consumption by not performing the eSIM-associated task 316 in the single standby state.

Figure 5:
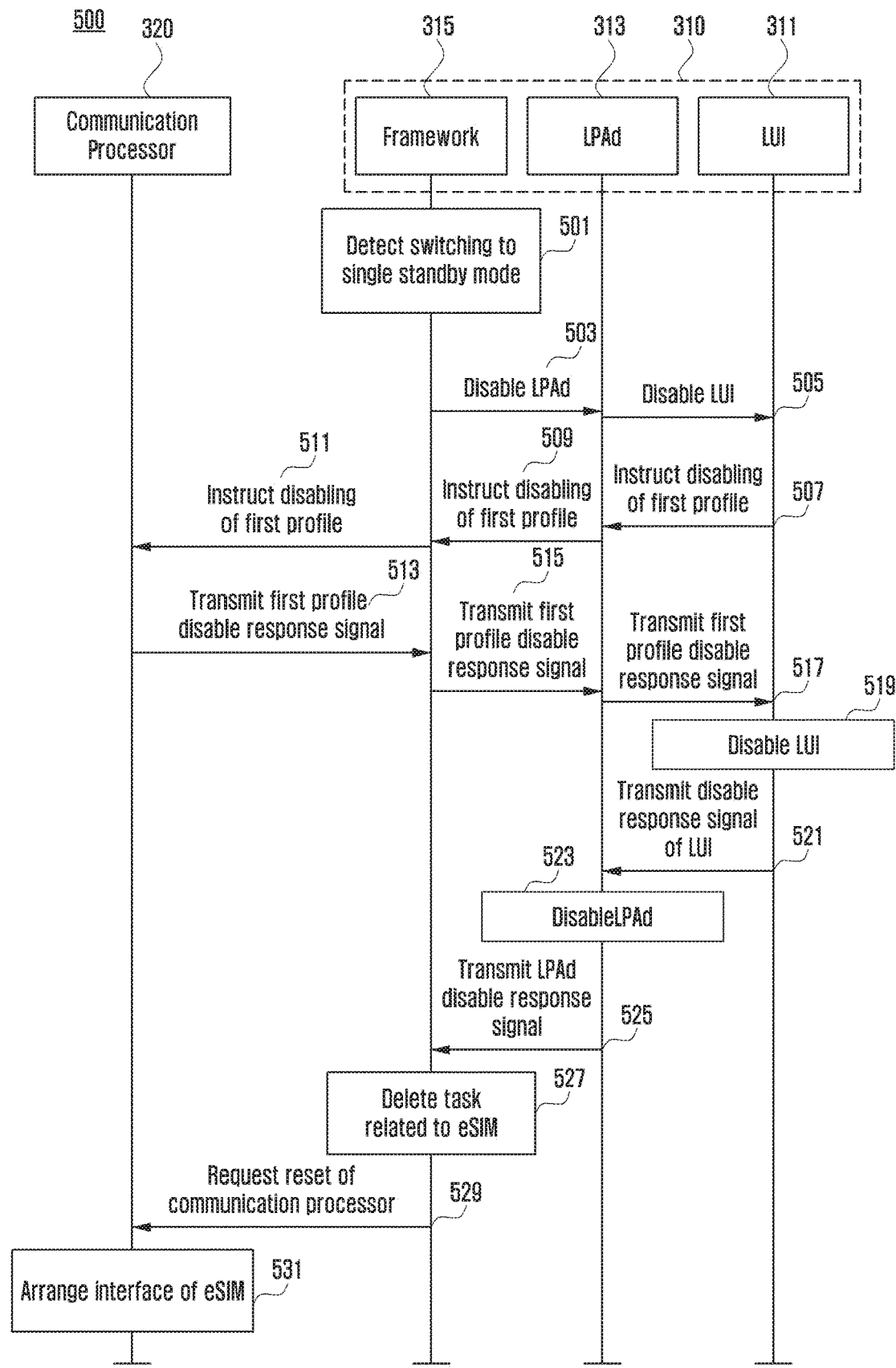
FIG. 5 is a flowchart illustrating an operation of switching from a dual standby mode to a single standby mode in an electronic device according to an embodiment of the disclosure.

FIG. 5 is a block diagram illustrating a configuration associated with switching from a dual standby mode to a single standby mode in an electronic device according to an embodiment of the disclosure.

Referring to FIG. 5, in an electronic device 500 according to various embodiments, in operation 501, a framework (e.g., the telephony framework 315) may detect switching to a single standby mode.

According to various embodiments, the electronic device 101 may detect switching from the dual standby mode, in which the first communication service using the eSIM (e.g., the eSIM 330 in FIG. 3) and the second communication service using the pSIM (e.g., the pSIM 340 in FIG. 3) are both activated, to the single standby mode.

According to various embodiments, the single standby mode may be a mode in which the first communication service is activated and the second communication service is deactivated or a mode in which the second communication service is activated and the first communication service is deactivated. For convenience of description, the single standby mode is described assuming that the second communication service corresponding to the pSIM 340 is activated and the first communication service corresponding to the eSIM 330 is deactivated.

According to various embodiments, in operation 503, the framework 315 may transmit a signal requesting disabling of the LPAd 313 to the LPAd 313.

According to various embodiments, in operation 505, the LPAd 313 may transmit a signal requesting disabling of the LUI 311 to the LUI 311.

According to various embodiments, in operation 507, the LUI 311 may transmit a signal instructing disabling of the first profile to the LPAd 313.

According to various embodiments, in operation 509, the LPAd 313 may transmit the signal instructing disabling of the first profile to the framework 315.

According to various embodiments, in operation 511, the framework 315 may transmit the signal instructing disabling of the first profile to the communication processor 320.

According to various embodiments, in operation 513, the communication processor 320 may transmit a first profile disable response signal to the framework 315.

According to various embodiments, in operation 513, the communication processor 320 may perform the operation of disabling the first profile and may transmit a response signal including the result of performing the disabling operation to the framework 315.

According to various embodiments, in operation 515, the framework 315 may transmit a first profile disable response signal to the LPAd 313.

According to various embodiments, in operation 517, the LPAd 313 may transmit the first profile disable response signal to the LUI 311.

According to various embodiments, in operation 519, the LUI 311 may perform an operation of disabling the LUI 311.

According to various embodiments, since the LUI 311 is disabled, the electronic device 101 may not provide a user interface associated with management of the first profile in the single standby mode.

According to various embodiments, in operation 521, the LUI 311 may transmit a disable response signal of the LUI 311 to the LPAd 313.

According to various embodiments, the disable response signal of the LUI 311 may include data indicating whether the operation of disabling the LUI 311 is successful.

According to various embodiments, in operation 523, the LPAd 313 may perform an operation of disabling the LPAd 313.

According to various embodiments, the LPAd 313 may disable the management function of the first profile. Through this, the LPAd 313 may be disabled in the single standby mode. The LPAd 313 may disable a function other than an event receiver function that receives a signal indicating switching from the single standby mode to the dual standby mode.

According to various embodiments, in operation 525, the LPAd 313 may transmit an LPAd disable response signal to the framework 315.

According to various embodiments, in operation 527, the framework 315 may delete the eSIM-associated task 316 related to the eSIM 330.

According to various embodiments, the eSIM-associated task 316 may mean a task associated with a communication service (the first communication service) corresponding to a profile stored in the eSIM 330. For example, the eSIM-associated task 316 may include tasks associated with various operations associated with a communication service (e.g., a call service, a message transmission or reception service, or a data transmission or reception service), which may be provided through a profile stored in the eSIM 330. The eSIM-associated task 316 may exist on the framework 315.

According to various embodiments, by deleting the eSIM-associated task 316, the eSIM-associated task 316 may not be performed on the framework 315. Through this, the electronic device 101 may reduce power consumption by not performing the eSIM-associated task 316 in the single standby state.

According to various embodiments, in operation 529, the framework 315 may transmit a reset request of the communication processor 320 to the communication processor 320.

According to various embodiments, in operation 531, the communication processor 320 may perform an operation of arranging an interface for transmitting or receiving data to or from the eSIM 330.

According to various embodiments, by deactivating the first protocol stack 323, the first communication service, which is a communication service using the eSIM 330, may be deactivated. Deactivating the first communication service may mean that no services (e.g., the first communication service using the first profile) are provided. Through this, the electronic device 101 may reduce power consumption caused by activation of the first protocol stack 323 corresponding to the eSIM 330 in the single standby state.

According to various embodiments, the deactivation of the first protocol stack 323 may include a mode in which identification information (e.g., IMEI) stored in the deactivated memory of the communication processor 320 is disabled such that the identification information cannot be referred to on the electronic device 101.

Figure 6:
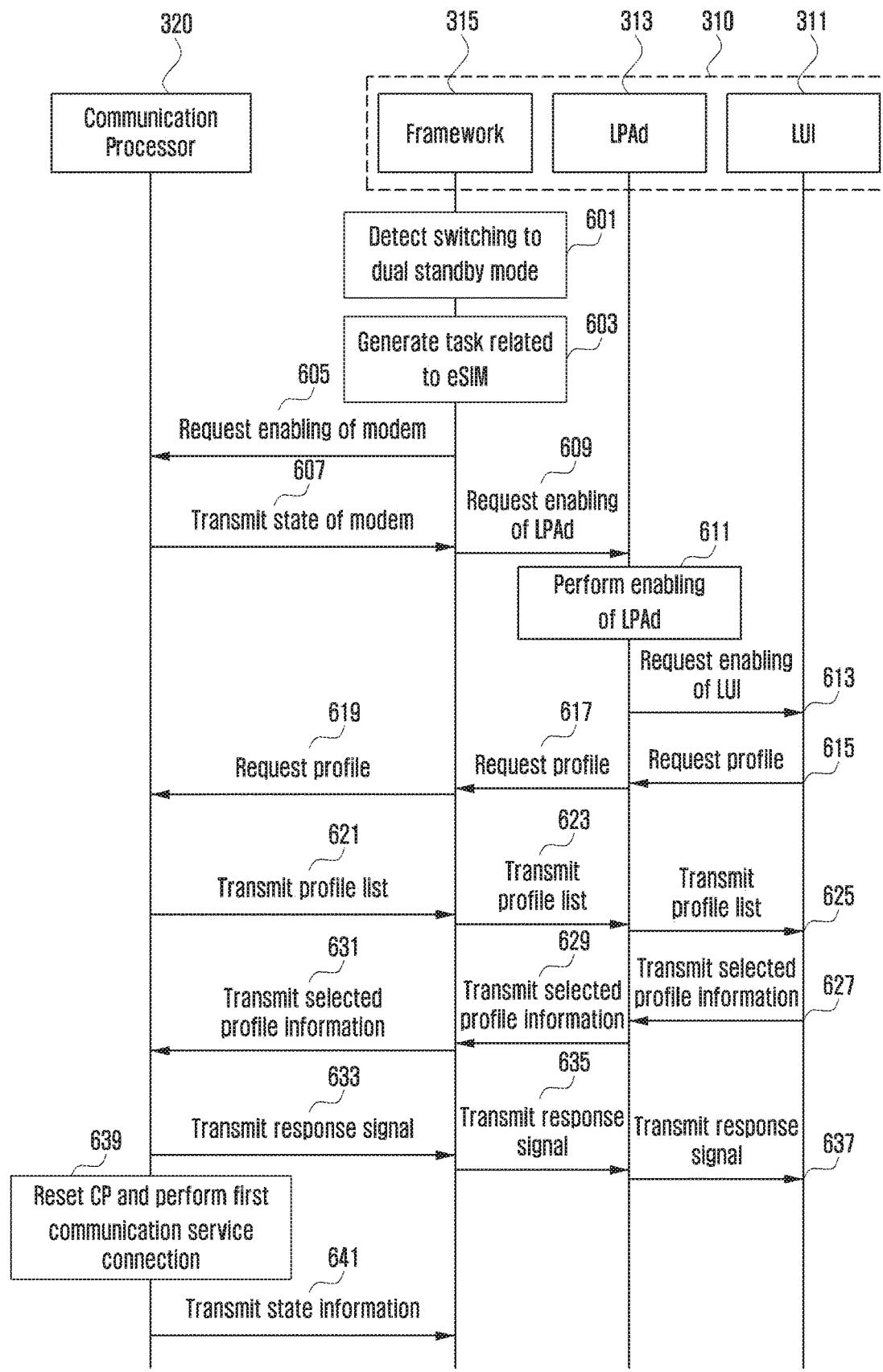
FIG. 6 is a flowchart illustrating an operation of switching from a single standby mode to a dual standby mode in an electronic device according to an embodiment of the disclosure.

FIG. 6 is a flowchart illustrating an operation of switching from a single standby mode to a dual standby mode in an electronic device according to an embodiment of the disclosure.

Referring to FIG. 6, in an electronic device according to various embodiments, in operation 601, a framework (e.g., the telephony framework 315) may detect switching to a dual standby mode.

According to various embodiments, in operation 603, the framework 315 may generate an eSIM-associated task 316 related to the eSIM 330.

According to various embodiments, in operation 605, the framework 315 may request enabling of a modem corresponding to the eSIM 330.

According to various embodiments, in operation 607, the communication processor 320 may enable the modem, and may transmit the state of the modem to the framework 315.

According to various embodiments, in operation 609, the framework 315 may request enabling of the LPAd 313.

According to various embodiments, in operation 611, the LPAd 313 may enable itself.

According to various embodiments, in operation 613, the LPAd 313 may transmit a signal requesting enabling of the LUI 311 to the LUI 311.

According to various embodiments, in operation 615, the LUI 311 may enable itself, and may transmit a signal requesting a list of one or more profiles stored in the eSIM 330 to the LPAd 313.

According to various embodiments, in operation 617, the LPAd 313 may transmit the signal requesting the list of one or more profiles stored in the eSIM 330 to the framework 315.

According to various embodiments, in operation 619, the framework 315 may transmit the signal requesting the list of one or more profiles stored in the eSIM 330 to the communication processor 320.

According to various embodiments, in operation 621, the communication processor 320 may transmit the list of one or more profiles stored in the eSIM 330 to the framework 315.

According to various embodiments, in operation 623, the framework 315 may transmit the list of one or more profiles stored in the eSIM 330 to the LPAd 313.

According to various embodiments, in operation 625, the LPAd 313 may transmit the list of one or more profiles stored in the eSIM 330 to the LUI 311.

According to various embodiments, the LUI 311 may receive the list for one or more profiles, and may generate a user interface for receiving user input for selecting one of the one or more profiles included in the profile list. The electronic device 101 may check the selected profile based on the user input received on the user interface generated by the LUI 311.

According to various embodiments, in operation 627, the LUI 311 may transmit selected profile information to the LPAd 313.

According to various embodiments, in operation 629, the LPAd 313 may transmit selected profile information to the framework 315.

According to various embodiments, in operation 631, the framework 315 may transmit the selected profile information to the communication processor 320.

According to various embodiments, in operation 633, the communication processor 320 may receive the selected profile information, and may perform an operation of activating the selected profile. The communication processor 320 may transmit a response signal to the framework 315.

According to various embodiments, the response signal may include the result of the operation of activating the selected profile, and may be a signal received from a server operated by the service provider providing the first communication service.

According to various embodiments, in operation 635, the framework 315 may transmit the response signal to the LPAd 313.

According to various embodiments, in operation 637, the LPAd 313 may transmit the response signal to the LUI 311.

According to various embodiments, in operation 639, the communication processor 320 may reset the communication processor 320, and may perform a connection to the first communication service.

According to various embodiments, the connection to the first communication service may include an operation of registering the electronic device 101 in a communication network operated by a service provider providing the first communication service and an operation of performing authentication for using the first communication service with an external service operated by the service provider providing the first communication service.

According to various embodiments, in operation 641, the communication processor 320 may transmit state information of the modem corresponding to the eSIM 330 to the framework 315.

According to various embodiments, the state information of the modem corresponding to the eSIM 330 may include information indicating whether a procedure for using the first communication service is successful.

FIGS. 7A, 7B, 7C, and 7D are views illustrating a screen displayed at the time of mode switching in an electronic device according to various embodiments of the disclosure.

According to various embodiments, an electronic device (e.g., the electronic device 101 in FIG. 1) may receive information on a right to enter the dual standby mode from an external server operated by a manufacturer of the electronic device or an external server operated by a service provider providing a communication service.

According to various embodiments, when a service provider providing a communication service used by the electronic device 101 supports the dual standby mode, an external server operated by a manufacturer of the electronic device or an external server operated by a service provider may transmit information indicating that the electronic device 101 has a right to enter the dual standby mode, to the electronic device 101.

According to various embodiments, the electronic device 101 may store information indicating whether the dual standby mode is supported, and information indicating the user's right to modify whether the dual standby mode is supported, in memory (e.g., the non-volatile memory 134 in FIG. 1).

According to various embodiments, the user's right to modify whether the dual standby mode is supported may mean a right to be capable of selecting whether the electronic device 101 is to enter the dual standby mode by user input.

According to various embodiments, in response to confirming that there is a user right to be capable of selecting whether to enter the dual standby mode, the electronic device 101 may control the LUI (e.g., the LUI 311 in FIG. 3) to generate a user interface for selecting whether to enter the dual standby mode.

Figure 7A:
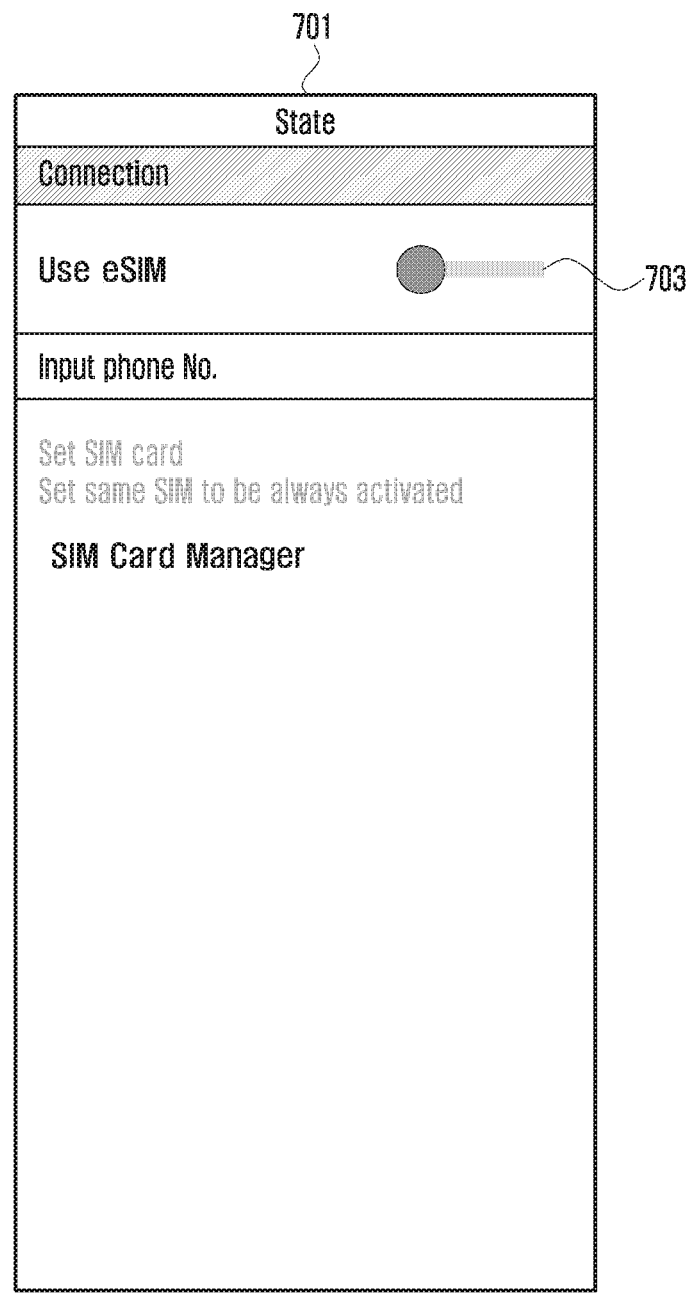
FIGS. 7A, 7B, 7C, and 7D are views illustrating a screen displayed at the time of mode switching in an electronic device according to various embodiments of the disclosure.

FIG. 7A illustrates an embodiment of a screen 701 of an application for managing a profile. Referring to FIG. 7A, the LUI 311 may generate a user interface 703 for selecting whether to enter the dual standby mode, and may display the user interface 703.

According to various embodiments, in response to confirming that there is not a user right to be capable of selecting whether to enter the dual standby mode, the electronic device 101 may not generate the user interface for selecting whether to enter the dual standby mode.

Figure 7B:
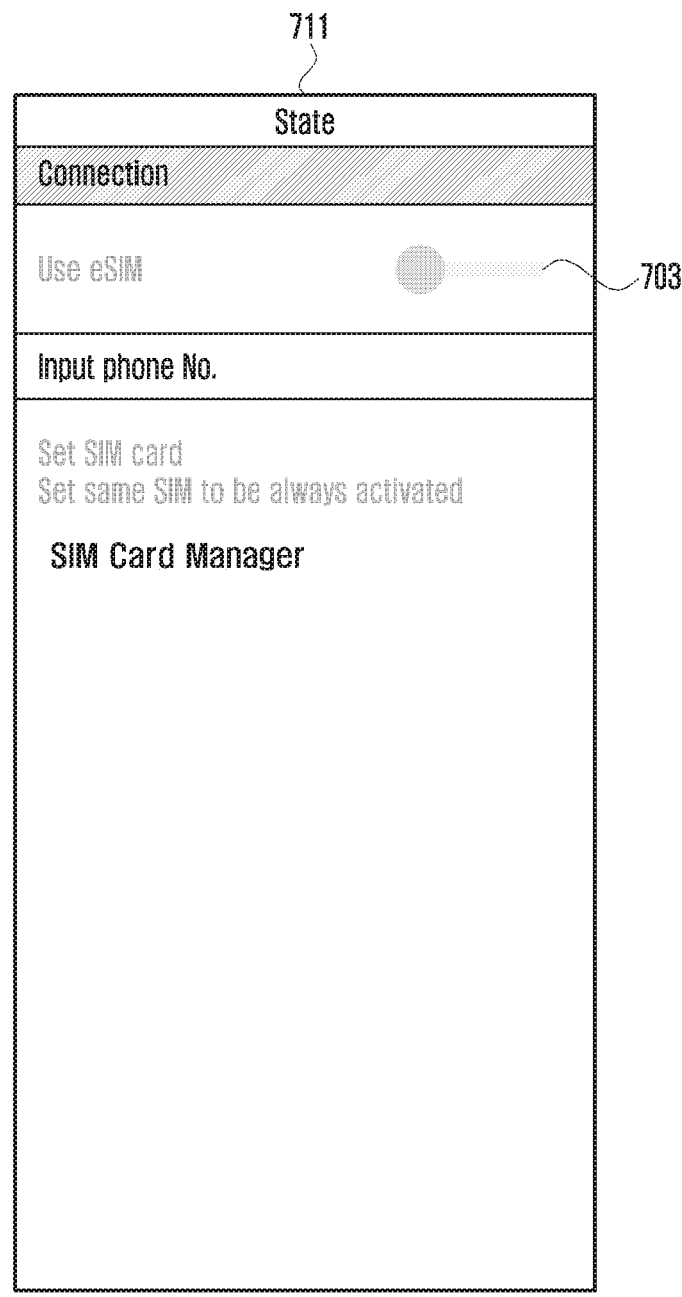

FIG. 7B illustrates a screen 711 of an application for managing a profile. Referring to FIG. 7B, it may be confirmed that the screen 711 does not display a user interface (e.g., the user interface 703 in FIG. 7A) for selecting whether to enter the dual standby mode.

According to various embodiments, when the electronic device 101 supports the dual standby mode, the LUI 311 may provide a user interface for managing the eSIM 330.

Figure 7C:
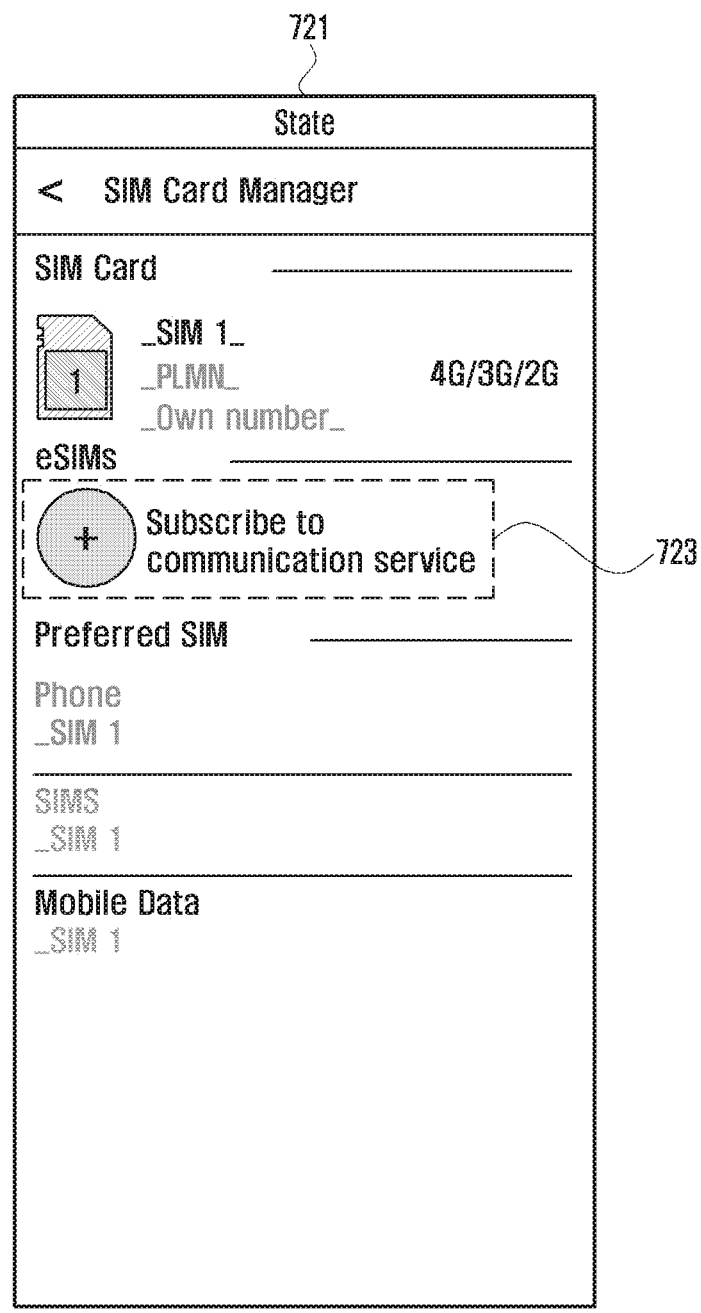

FIG. 7C illustrates a screen 721 of an application for managing a profile. Referring to FIG. 7C, the screen 721 may include a user interface 723 for managing the eSIM 330. The user interface 723 illustrated in FIG. 7C is a user interface for adding a profile to the eSIM 330. When a profile has already been added, the LUI 311 may provide a user interface for managing a profile stored in the eSIM 330.

According to various embodiments, when the electronic device 101 does not support the dual standby mode, the LUI 311 may not provide the user interface for managing the eSIM 330.

Figure 7D:
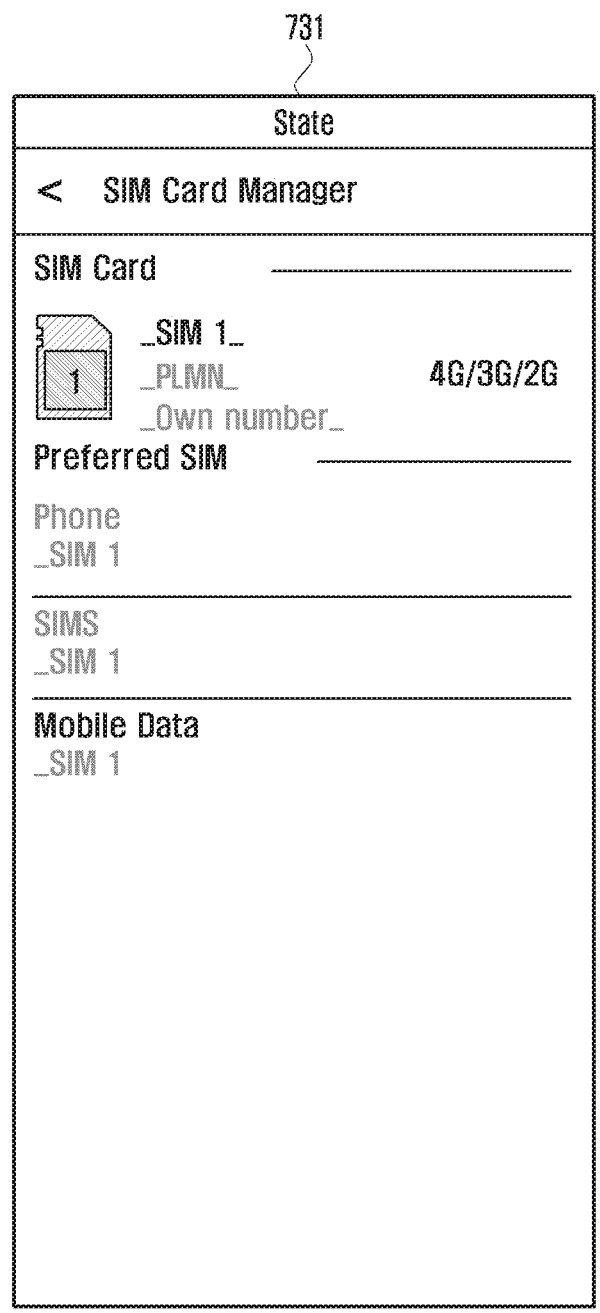

FIG. 7D illustrates a screen 731 of an application for managing a profile. Referring to FIG. 7D, the screen 731 does not provide a user interface 723 for managing the eSIM 330.

Figure 8A:
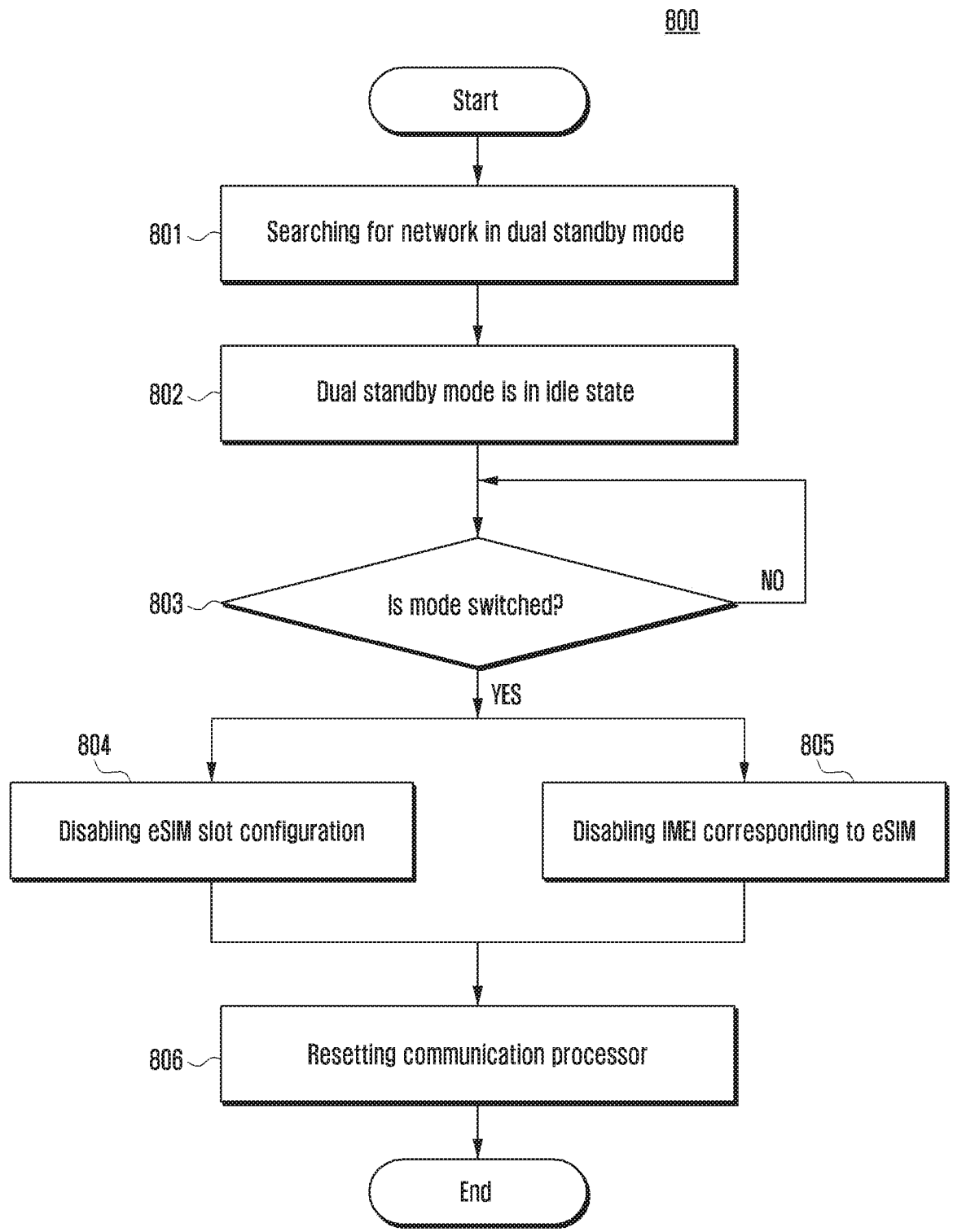
FIGS. 8A and 8B are flowcharts illustrating an operation at the time of mode switching in an electronic device according to various embodiments of the disclosure.
Figure 8B:
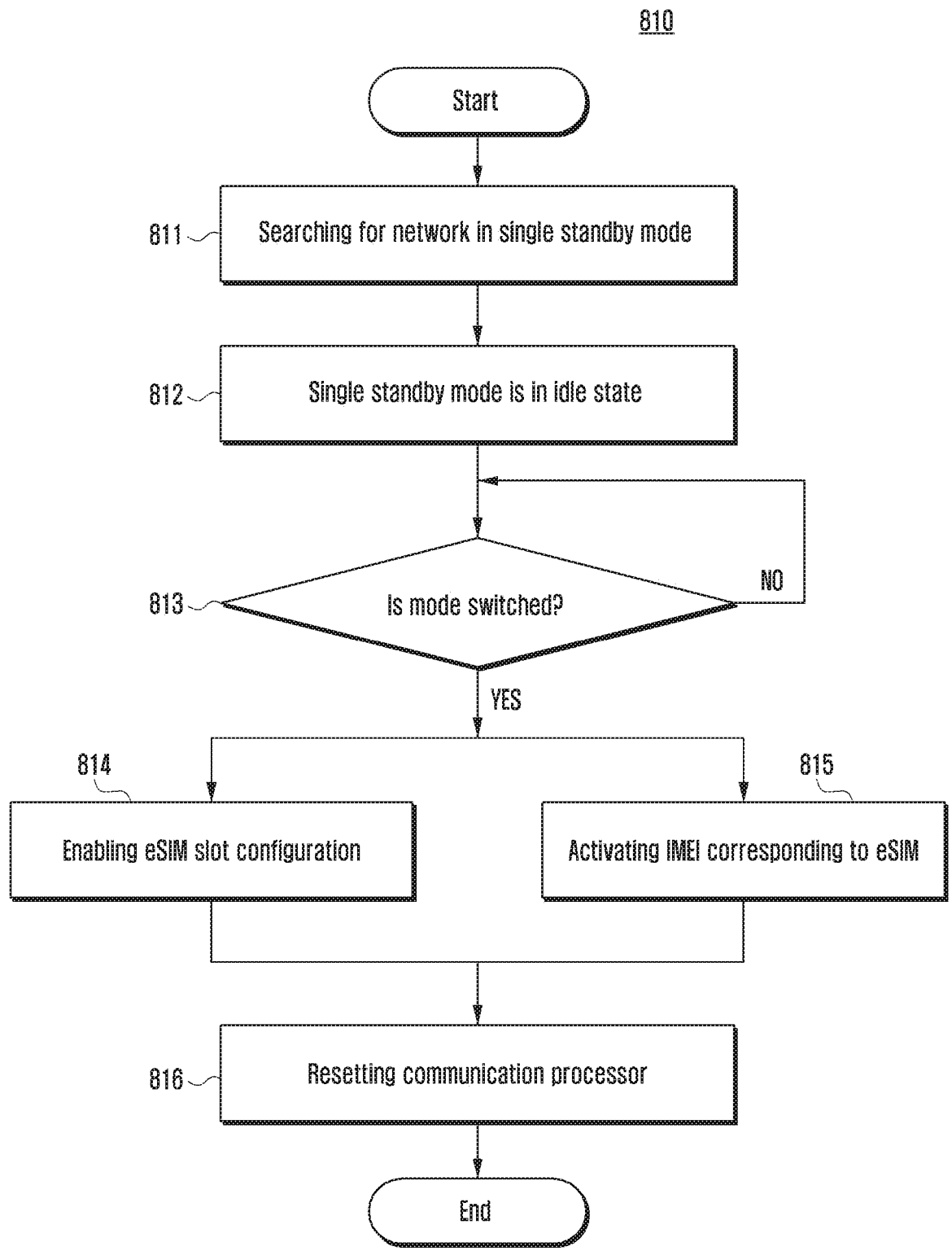

FIGS. 8A and 8B are flowcharts illustrating an operation at the time of mode switching in an electronic device according to various embodiments of the disclosure.

FIG. 8A illustrates an embodiment of switching from a dual standby mode to a single standby mode (800) in an electronic device according to various embodiments.

According to various embodiments, in operation 801, the electronic device (e.g., the electronic device 101 in FIG. 1) may perform an operation of searching for a network to which to connect in a dual standby mode.

According to various embodiments, the electronic device 101 may be in the state in which the eSIM 330 and the pSIM 340 are initialized and are not connected to the first communication service or to the second communication service. The electronic device 101 may perform operation 801 in the state in which the first communication service and the second communication service are not connected.

According to various embodiments, in operation 802, the electronic device 101 performs a connection with a searched network (e.g., a network supported by the first communication service or a network supported by the second communication service), and may enter the dual standby mode.

According to various embodiments, in operation 803, the electronic device 101 may determine whether to switch from the dual standby mode to the single standby mode.

According to various embodiments, the single standby mode may be a mode in which the first communication service is activated and the second communication service is deactivated or a mode in which the second communication service is activated and the first communication service is deactivated. For convenience of description, the single standby mode is described assuming that the second communication service corresponding to the pSIM 340 is activated and the first communication service corresponding to the eSIM 330 is deactivated.

According to various embodiments, the electronic device 101 may determine to switch to the single standby mode in response to reception of user input for switching from the dual standby mode to the single standby mode. In this case, the user of the electronic device 101 may have a user right to switch from the dual standby mode to the single standby mode.

According to various embodiments, the electronic device 101 may determine to switch to the single standby mode based on information received from an external server operated by a manufacturer of the electronic device 101 or an external server operated by a service provider of a communication service used by the electronic device 101.

According to various embodiments, the electronic device 101 may determine to switch to the single standby mode based on context information of the electronic device 101 (e.g., battery state information of the electronic device 101).

According to various embodiments, in operation 804, the electronic device 101 may disable the slot configuration of the eSIM 330.

According to various embodiments, disabling the slot configuration of the eSIM 330 may mean changing an indicator indicating disabling of the eSIM 330 to a disabled state.

According to various embodiments, in operation 805, the electronic device 101 may disable identification information (e.g., IMEI) stored in a deactivated memory of the communication processor 320. Disabling the identification information may indicate the fact that the electronic device 101 is not able to refer to the identification information corresponding to the eSIM 330.

According to various embodiments, in operation 806, the electronic device 101 may reset the communication processor 320.

According to various embodiments, the electronic device 101 may apply the changed slot configuration of the eSIM 330 by resetting the communication processor 320.

According to various embodiments, the changed slot configuration of the eSIM 330 may be stored in the deactivated memory of the communication processor 320, and the electronic device 101 may reset the communication processor 320 to apply the changed slot configuration of the eSIM 330.

According to various embodiments, the electronic device 101 may perform an operation of switching from the dual standby mode to the single standby mode by performing at least one of operation 804 and operation 805. For example, the electronic device 101 may disable the eSIM slot configuration in operation 804 and may reset the communication processor 320. As another example, the electronic device 101 may disable identification information in operation 805 and may reset the communication processor 320. As another example, the electronic device 101 may disable the eSIM slot configuration in operation 804, may disable identification information in operation 805, and may then reset the communication processor 320.

FIG. 8B illustrates an embodiment of switching from a single standby mode to a dual standby mode (810) in an electronic device according to various embodiments.

According to various embodiments, in operation 811, the electronic device (e.g., the electronic device 101 in FIG. 1) may perform an operation of searching for a network to which to connect in a single standby mode.

According to various embodiments, a network to which to connect in the single standby mode may be a network corresponding to the second communication service supported by the pSIM 340.

According to various embodiments, the electronic device 101 may be in the state in which the eSIM 330 and the pSIM 340 are initialized and are not connected to the first communication service or to the second communication service. The electronic device 101 may perform operation 811 in the state in which the first communication service and the second communication service are not connected.

According to various embodiments, in operation 812, the electronic device 101 may perform a connection with a searched network (e.g., a network supported by the second communication service), and may enter the single standby mode.

According to various embodiments, in operation 813, the electronic device 101 may determine whether to switch from the single standby mode to the dual standby mode.

According to various embodiments, the dual standby mode may be the state in which both the first communication service and the second communication service are activated, whereby a modem supporting the first communication service and a modem supporting the second communication service are both activated.

According to various embodiments, the electronic device 101 may determine to switch to the dual standby mode in response to reception of user input for switching from the single standby mode to the dual standby mode. In this case, the user of the electronic device 101 may have a user right to switch from the single standby mode to the dual standby mode.

According to various embodiments, the electronic device 101 may determine to switch to the dual standby mode based on information received from an external server operated by a manufacturer of the electronic device 101 or an external server operated by a service provider of a communication service used by the electronic device 101.

According to various embodiments, the electronic device 101 may determine to switch to the dual standby mode based on context information of the electronic device 101 (e.g., battery state information of the electronic device 101).

According to various embodiments, in operation 814, the electronic device 101 may enable the slot configuration of the eSIM 330.

According to various embodiments, enabling the slot configuration of the eSIM 330 may mean changing an indicator indicating enabling of the eSIM 330 to an enabled state.

According to various embodiments, in operation 815, the electronic device 101 may activate identification information (e.g., IMEI) stored in deactivated memory of the communication processor 320. Deactivating the identification information may indicate that the electronic device 101 is able to refer to the identification information corresponding to the eSIM 330.

According to various embodiments, in operation 816, the electronic device 101 may reset the communication processor 320.

According to various embodiments, the electronic device 101 may apply the changed slot configuration of the eSIM 330 by resetting the communication processor 320.

According to various embodiments, the changed slot configuration of the eSIM 330 may be stored in the deactivated memory of the communication processor 320, and the electronic device 101 may reset the communication processor 320 to apply the changed slot configuration of the eSIM 330.

According to various embodiments, the electronic device 101 may perform an operation of switching from the single standby mode to the dual standby mode by performing at least one of operation 814 and operation 815. For example, the electronic device 101 may enable the eSIM slot configuration in operation 814, and may reset the communication processor 320. As another example, the electronic device 101 may activate identification information in operation 815, and may reset the communication processor 320. As another example, the electronic device 101 may enable the eSIM slot configuration in operation 814, may activate identification information in operation 815, and may then reset the communication processor 320.

Figure 9A:
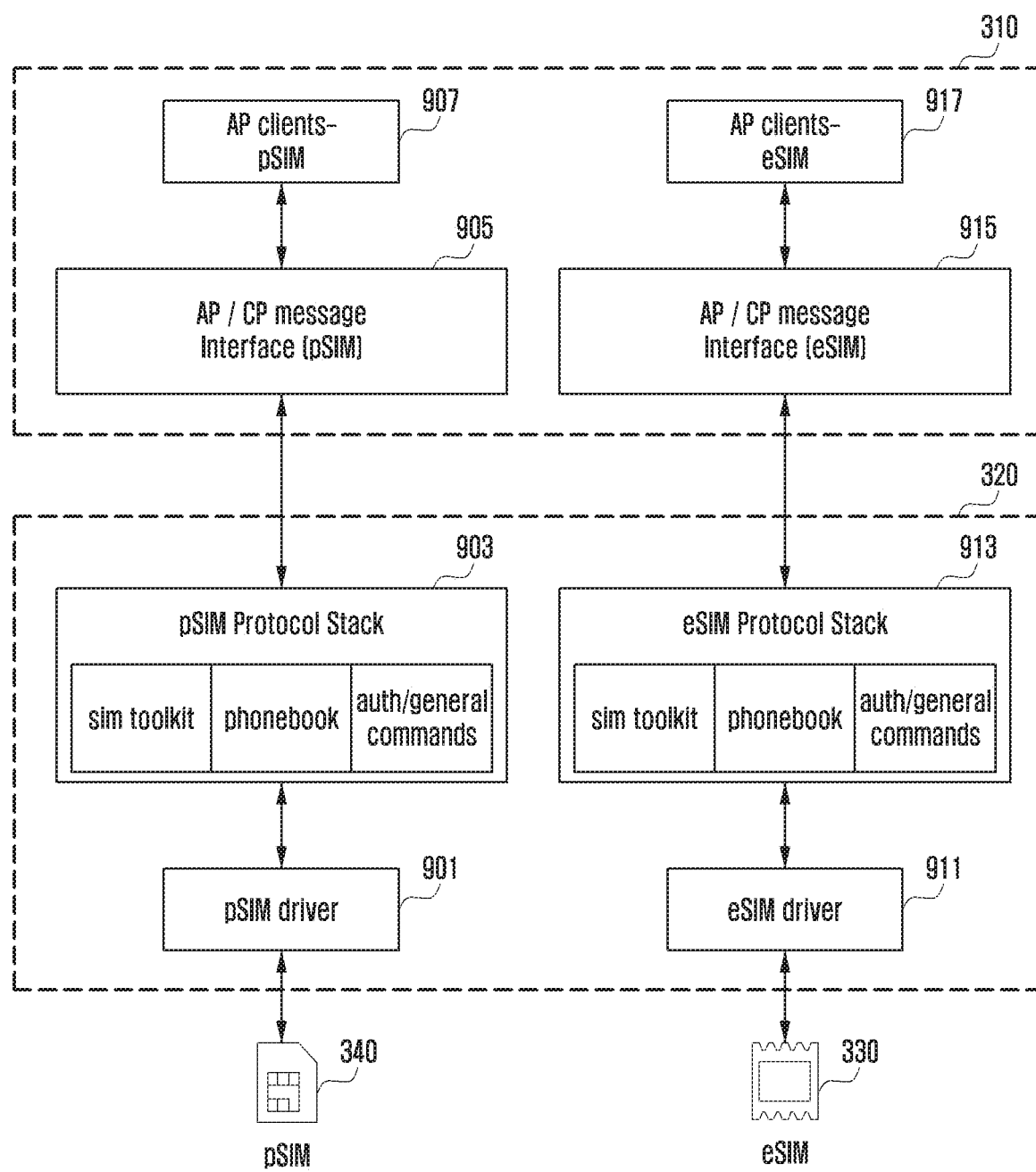
FIGS. 9A and 9B are views illustrating a software structure in a single standby mode and a dual standby mode in an electronic device according to various embodiments of the disclosure.
Figure 9B:
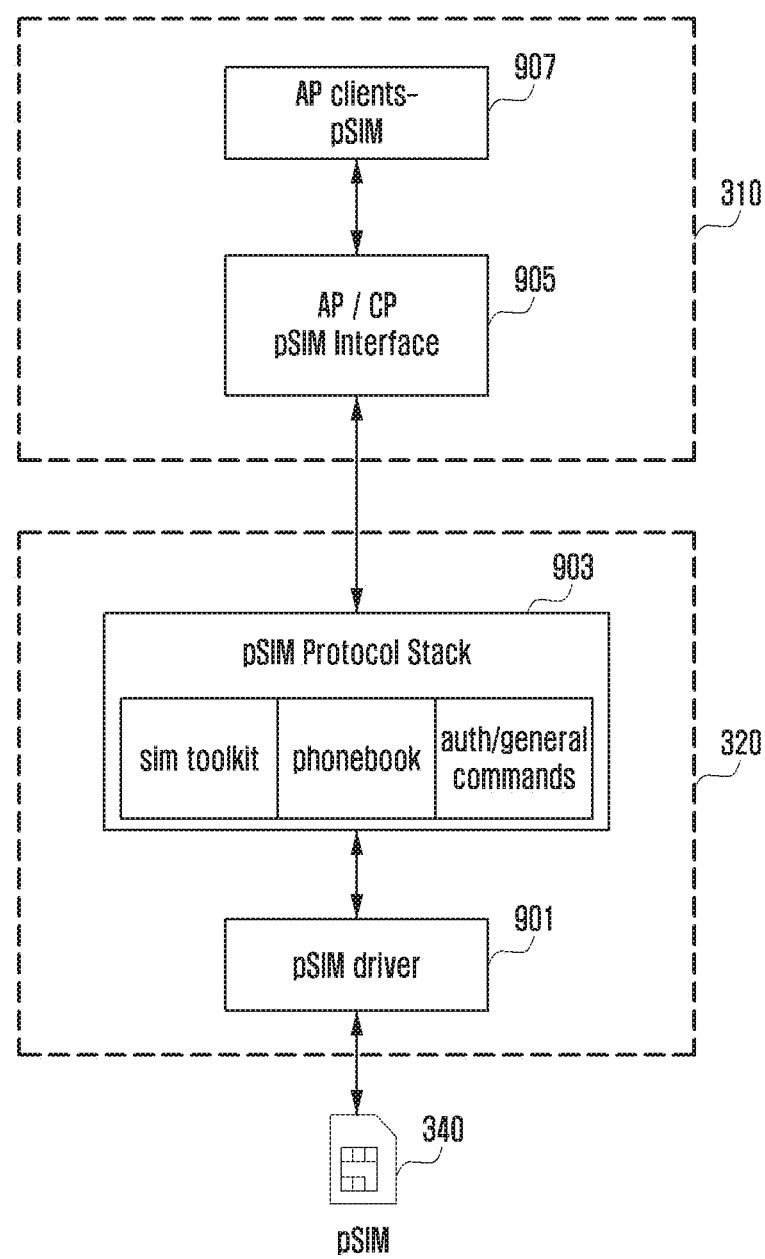

FIGS. 9A and 9B are views illustrating a software structure in a single standby mode and a dual standby mode in an electronic device according to an embodiment of the disclosure.

FIG. 9A illustrates a software architecture model between the pSIM 340 and the processor 310 and a software architecture model between the eSIM 330 and the processor 310 in the dual standby mode.

Referring to FIG. 9A, the pSIM 340 and the communication processor 320 may be operatively connected to each other. ApSIM driver 901 and a pSIM protocol stack 903 for transmitting/receiving data between the pSIM 340 and software may be implemented on the communication processor 320. A task associated with the pSIM driver 901 and the pSIM 903 may be executed on the communication processor 320, and may include the operations described below.

According to various embodiments, the pSIM protocol stack 903 may include a toolkit for performing operations (e.g., storing phone numbers and storing instruction words) using a profile stored in a SIM card inserted into the pSIM 340.

According to various embodiments, the communication processor 320 and the processor 310 may be operatively connected to each other. An interface 905 for transmitting/ receiving data between the communication processor 320 and the processor 310 and a client 907 for executing an application associated with the pSIM 340 may be implemented on the processor 310.

According to various embodiments, the communication eSIM 330 and the communication processor 320 may be operatively connected to each other. An eSIM driver 911 and an eSIM protocol stack 913 for transmitting/receiving data between the eSIM 330 and software may be implemented on the communication processor 320.

According to various embodiments, the eSIM protocol stack 913 may include a toolkit for performing operations (e.g., storing phone numbers and storing instruction words) using a profile stored in the eSIM 330.

According to various embodiments, the communication processor 320 and the processor 310 may be operatively connected to each other. An interface 915 for transmitting/ receiving data between the communication processor 320 and the processor 310 and a client 917 for executing an application associated with the eSIM 330 may be implemented on the processor 310.

The architectural model illustrated in FIG. 9A may be implemented in the dual standby mode. The architectural model illustrated in FIG. 9B may be implemented in the single standby mode.

Referring to FIG. 9B, in the single standby mode, among the software architecture model between the pSIM 340 and the processor 310 illustrated in FIG. 9A and the software architecture model between the eSIM 330 and the processor 310, the software architecture between the eSIM 330 and the processor 310 may not be implemented.

According to various embodiments, since the software architecture model between the eSIM 330 and the processor 310 is not implemented, the electronic device 101 may not perform various operations associated with the driving of the eSIM 330 (e.g., an operation of checking whether the eSIM 330 is electrically connected, an operation of initializing the eSIM 330, an operation of transmitting a polling signal for recognizing the eSIM 330, an operation of retrieving a contact point stored in the eSIM 330, or an operation of searching for a network corresponding to the eSIM 330).

According to various embodiments, since the eSIM protocol stack 913 is deactivated, the software architecture model between the eSIM 330 and the processor 310 may not be implemented.

According to various embodiments, in the single standby mode, when the eSIM protocol stack 913 is activated, the software architecture model between the eSIM 330 and the processor 310 may be implemented, and various operations associated with the driving of the eSIM 330 may be performed even though a corresponding communication service is not connected to the eSIM 330. According to various embodiments, the electronic device 101 is capable of reducing power consumption by not performing an operation associated with the driving of the eSIM 330 in the single standby state.

An electronic device according to various embodiments may include an eSIM embedded in the electronic device, the eSIM being configured to store a first profile associated with the first communication service, a pSIM configured such that a SIM card is capable of being removably attached thereto or capable of being inserted thereinto, the pSIM being configured to store a second profile associated with a second communication service, a communication processor configured to control the eSIM and the pSIM, and a processor. The processor may be configured to receive a signal indicating switching from a dual standby mode, in which the first communication service and the second communication service are available, to a single standby mode, in which the second communication service is available, control a local profile assistant in device (LPAd) configured to control the eSIM in response to reception of the signal, delete a task associated with the eSIM in response to completion of disabling of the LPAd, request an operation of deactivating a protocol stack corresponding to the eSIM in response to deletion of the task, and reset the communication processor in response to deactivation of the protocol stack.

In the electronic device according to various embodiments, the processor may be configured to disable a local user interface (LUI) configured to control a user interface to disable an operation of displaying a user interface associated with management of the first profile.

In the electronic device according to various embodiments, the processor may be configured to disable a radio interface layer existing in a hardware abstraction layer (HAL) and configured to transmit or receive data to or from the modem while deleting the task associated with the embedded subscriber identity module.

In the electronic device according to various embodiments, the processor may be configured not to upload the task associated with the embedded subscriber identity module in memory when the electronic device is rebooted after the task associated with the embedded subscriber identity module is removed.

In the electronic device according to various embodiments, the processor may be configured to control the LPAd to perform an operation of disabling a remaining component other than an event receiver configured to receive a signal indicating switching to the dual standby mode.

In the electronic device according to various embodiments, the processor may be configured to perform switching from a disabled state to an enabled state of the LPAd in response to reception of the signal indicating switching to the dual standby mode, generate a task associated with the embedded subscriber identity module, and activate the first communication service based on the generated task.

In the electronic device according to various embodiments, the processor may be configured to activate a local user interface (LUI) configured to manage a user interface associated with management of the first profile; and generate a task associated with the embedded subscriber identity module in response to reception of user input on the user interface for selecting the first profile.

In the electronic device according to various embodiments, the processor may be configured to control the LUI to provide a user interface for selecting one of a plurality of profiles when the plurality of profiles are stored in the embedded subscriber identity module.

In the electronic device according to various embodiments, the processor may be configured to deactivate the protocol stack so as to prevent reference to identification information corresponding to the embedded subscriber identity module.

In the electronic device according to various embodiments, the deleted task may exist in a framework layer of the processor.

Figure 10:
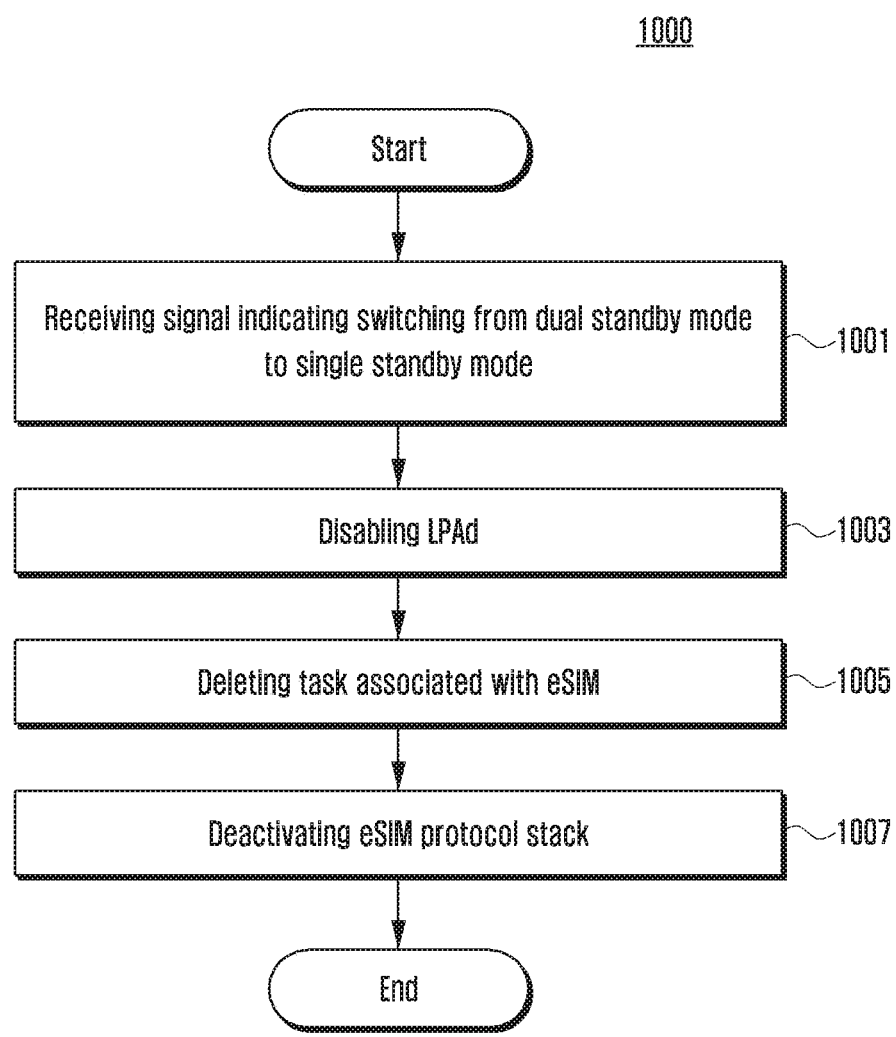
FIG. 10 is a flowchart illustrating operations of an electronic device operating method according to an embodiment of the disclosure.

FIG. 10 is a flowchart illustrating operations of an electronic device operating method (1000) according to an embodiment of the disclosure.

According to various embodiments, in operation 1001, an operation (e.g., the electronic device 101 in FIG. 1) (e.g., the processor 310 in FIG. 1) may receive a signal indicating switching from the dual standby mode to the single standby mode.

According to various embodiments, the electronic device 101 may support a dual standby mode, in which both the first communication service and the second communication service are activated. The dual standby mode may mean a mode in which the first communication service and the second communication service can be used simultaneously or separately. The electronic device 101 may support a single standby mode, in which any one of the first communication service and the second communication service is activated. The single standby mode may be a mode in which the first communication service is activated and the second communication service is deactivated or a mode in which the second communication service is activated and the first communication service is deactivated. For convenience of description, the single standby mode is described assuming that the second communication service corresponding to the pSIM 340 is activated and the first communication service corresponding to the eSIM 330 is deactivated.

According to various embodiments, a signal indicating switching from the dual standby mode to the single standby mode may be generated by user input on a user interface provided by the LUI (e.g., the LUI 311 in FIG. 3). The processor 310 may receive user input by which the user switches to the single standby mode on the user interface provided by the LUI 311.

According to various embodiments, a signal indicating switching from the dual standby mode to the single standby mode may be provided by an external server operated by a service provider that provides the first communication service or the second communication service or an external server operated by the manufacturer of the electronic device 101. The external server may transmit a signal indicating switching to the single standby mode in the state in which one of the first communication service or the second communication service cannot be provided.

According to various embodiments, in operation 1003, the electronic device 101 (e.g., the processor 310) may disable the LPAd (e.g., the LPAd 313 in FIG. 3).

According to various embodiments, the LPAd 313 may mean an application that manages at least one profile capable of being stored in the eSIM 330. The LPAd 313 may manage the first profile (e.g., perform various management tasks including modifying the first profile, deleting the first profile, and updating the first profile).

According to various embodiments, the LPAd 313 may disable the management function of the first profile. Through this, the LPAd 313 may be disabled in the single standby mode. The LPAd 313 may disable a function other than an event receiver function that receives a signal indicating switching from the single standby mode to the dual standby mode.

According to various embodiments, the electronic device 101 may control the LPAd 313 to be disabled in response to reception of the signal indicating switching to the single standby mode. Since the LPAd 313 is disabled, the electronic device 101 may not provide a user interface associated with management of the first profile in the single standby mode.

According to various embodiments, in operation 1005, the electronic device 101 (e.g., the processor 310) may delete the task associated with the eSIM 330.

According to various embodiments, the eSIM-associated task 316 associated with the eSIM may be a task related to a communication service (the first communication service) corresponding to a profile stored in the eSIM 330. For example, the eSIM-associated task 316 may include tasks associated with various operations associated with a communication service (e.g., a call service, a message transmission or reception service, or a data transmission or reception service), which may be provided through a profile stored in the eSIM 330.

According to various embodiments, by deleting the eSIM-associated task 316, the eSIM-associated task 316 may not be performed on the framework 315. Through this, the electronic device 101 may reduce power consumption by not performing the eSIM-associated task 316 in the single standby state.

According to various embodiments, the LPAd 313 may be controlled not to upload the eSIM-associated task 316 to RAM when the electronic device 101 is rebooted in the single standby mode. Through this, the electronic device 101 may reduce power consumption by not performing the eSIM-associated task 316 in the single standby state.

According to various embodiments, in operation 1007, the electronic device 101 may deactivate the first (i.e., eSIM) protocol stack 323.

According to various embodiments, by deactivating the eSIM protocol stack 323, the first communication service, which is a communication service using the eSIM 330, may be deactivated. Deactivating the first communication service may mean that no services (e.g., the first communication service using the first profile) are provided. Through this, the electronic device 101 may reduce power consumption caused by activation of the eSIM protocol stack 323 corresponding to the eSIM 330 in the single standby state.

According to various embodiments, the deactivation of the eSIM protocol stack 323 may include a mode in which identification information (e.g., IMEI) stored in the deactivated memory of the communication processor 320 is disabled such that the identification information cannot be referred to on the electronic device 101.

An electronic device operating method according to various embodiments may include an operation of receiving a signal indicating switching from a dual standby mode, in which the first communication service and the second communication service are available, to a single standby mode, in which the second communication service is available, an operation of disabling a local profile assistant in device (LPAd) configured to control an embedded subscriber identity module configured to store a first profile associated with the first communication service in response to reception of the signal, an operation of deleting a task associated with the embedded subscriber identity module in response to completion of disabling of the LPAd, an operation of deactivating a protocol stack corresponding to the embedded subscriber identity module in response to the deleting of the task, and an operation of resetting a communication processor configured to control the embedded subscriber identity module in response to the deactivating of the protocol stack.

The electronic device operating method according to various embodiments may further include an operation of disabling a local user interface (LUI) configured to control a user interface to disable an operation of displaying a user interface associated with management of the first profile.

In the electronic device operating method according to various embodiments, the operation of deleting the task associated with the embedded subscriber identity module may include an operation of disabling a radio interface layer existing in a hardware abstraction layer (HAL) and configured to transmit or receive data to or from the modem while deleting the task associated with the embedded subscriber identity module.

The electronic device operating method according to various embodiments may further include an operation of performing control such that the task associated with the embedded subscriber identity module is not uploaded in memory when the electronic device is rebooted after the task associated with the embedded subscriber identity module is removed.

The electronic device operating method according to various embodiments may further include an operation of controlling the LPAd to perform an operation of disabling a remaining component other than an event receiver configured to receive a signal indicating switching to the dual standby mode.

The electronic device operating method according to various embodiments may further include an operation of performing switching from a disabled state to an enabled state of the LPAd in response to reception of the signal indicating switching to the dual standby mode, an operation of generating a task associated with the embedded subscriber identity module, and an operation of activating the first communication service based on the generated task.

The electronic device operating method may further include an operation of activating a local user interface (LUI) configured to manage a user interface associated with management of the first profile, and an operation of generating a task associated with the embedded subscriber identity module in response to reception of user input on the user interface for selecting the first profile.

The electronic device operating method may further include an operation of controlling the LUI to provide a user interface for selecting one of a plurality of profiles when the plurality of profiles are stored in the embedded subscriber identity module.

The electronic operating method according to various embodiments may further include an operation of deactivating the protocol stack so as to prevent reference to identification information corresponding to the embedded subscriber identity module from being made.

In the electronic device operating method, the deleted task may exist in a framework layer of the processor.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   an embedded subscriber identity module (eSIM) embedded in the electronic device, the eSIM being configured to store a first profile associated with a first communication service;
   a physical SIM (pSIM) configured such that a SIM card is capable of being removably attached thereto or capable of being inserted thereinto, the pSIM being configured to store a second profile associated with a second communication service; a communication processor configured to control the eSIM and the pSIM; and a processor configured to:
      receive a signal indicating switching from a dual standby mode, in which the first communication service and the second communication service are both available, to a single standby mode, in which the first communication service is unavailable and the second communication service is available;
      disable a local profile assistant in device (LPAd) configured to control the eSIM in response to receiving the signal;
      delete a task associated with the eSIM in response to completion of disabling the LPAd;
      request deactivating of a protocol stack corresponding to the eSIM in response to deleting the task; and
      reset the communication processor in response to deactivating the protocol stack.

2. The electronic device of claim 1, wherein the processor is further configured to disable a local user interface (LUI) configured to control a user interface to disable an operation of displaying a user interface associated with management of the first profile.

3. The electronic device of claim 1, wherein the processor is further configured to disable a radio interface layer (RIL) comprised in a hardware abstraction layer (HAL), wherein the RIL is configured to transmit or receive data to or from a modem while deleting the task associated with the eSIM.

4. The electronic device of claim 1, wherein the processor is further configured to not upload the task associated with the eSIM in memory when the electronic device is rebooted after the task associated with the eSIM is removed.

5. The electronic device of claim 1, wherein the processor is further configured to control the LPAd to disable a remaining component other than an event receiver configured to receive a signal indicating switching to the dual standby mode.

6. The electronic device of claim 5, wherein the processor is further configured to:
   switch from a disabled state to an enabled state of the LPAd in response to receiving the signal indicating switching to the dual standby mode,
   generate a task associated with the eSIM, and
   activate the first communication service based on the generated task.

7. The electronic device of claim 6, wherein the processor is further configured to:

activate a local user interface (LUI) configured to manage a user interface associated with management of the first profile, and generate a task associated with the eSIM in response to reception of user input, on the user interface, for selecting the first profile.

8. The electronic device of claim 7, wherein the processor is further configured to control the LUI to provide a user interface for selecting one of a plurality of profiles stored in the eSIM.

9. The electronic device of claim 1, wherein the processor is further configured to deactivate the protocol stack to prevent reference to identification information corresponding to the eSIM from being made.

10. The electronic device of claim 1, wherein the deleted task is comprised in a framework layer of the processor.

11. A method of operating an electronic device, the method comprising:

receiving a signal indicating switching from a dual standby mode, in which a first communication service and a second communication service are both available, to a single standby mode, in which the second communication service is available;

disabling a local profile assistant in device (LPAd) configured to control an embedded subscriber identity module (eSIM) configured to store a first profile associated with the first communication service in response to receiving the signal;

deleting a task associated with the eSIM in response to completion of disabling the LPAd;

deactivating a protocol stack corresponding to the eSIM in response to deleting the task; and resetting a communication processor configured to control the eSIM in response to deactivating the protocol stack.

12. The method of claim 11, further comprising:

disabling a local user interface (LUI) configured to control a user interface to disable an operation of displaying a user interface associated with management of the first profile.

13. The method of claim 11, further comprising:

disabling a radio interface layer (RIL) comprised in a hardware abstraction layer (HAL), wherein the RIL is configured to transmit or receive data to or from a modem while deleting the task associated with the eSIM.

14. The method of claim 11, further comprising:

performing control such that the task associated with the eSIM is not uploaded in memory when the electronic device is rebooted after the task associated with the eSIM is removed.

15. The method of claim 11, further comprising:

controlling the LPAd to disable a remaining component other than an event receiver configured to receive a signal indicating switching to the dual standby mode.

16. The method of claim 15, further comprising:

switching from a disabled state of the LPAd to an enabled state thereof in response to receiving the signal indicating switching to the dual standby mode;

generating a task associated with the eSIM; and activating the first communication service based on the generated task.

17. The method of claim 16, further comprising:

activating a local user interface (LUI) configured to manage a user interface associated with management of the first profile; and generating a task associated with the eSIM in response to reception of user input, on the user interface, for selecting the first profile.

18. The method of claim 17, further comprising:

controlling the LUI to provide a user interface for selecting one of a plurality of profiles stored in the eSIM.

19. The method of claim 11, further comprising:

deactivating the protocol stack to thereby prevent reference to identification information corresponding to the eSIM.

20. The method of claim 11, wherein the deleted task is comprised in a framework layer of the processor.

* * * * *